US012124315B2

(12) United States Patent
Pimparkar

(10) Patent No.: US 12,124,315 B2
(45) Date of Patent: Oct. 22, 2024

(54) STEPPED CLOCKING FREQUENCY MODE FOR INTEGRATED CIRCUIT COMPONENTS

(71) Applicant: QUALCOMM Incorporated, San Diego, CA (US)

(72) Inventor: Swapneel Kiranrao Pimparkar, Bengaluru (IN)

(73) Assignee: QUALCOMM Incorporated, San Diego, CA (US)

( * ) Notice: Subject to any disclaimer, the term of this patent is extended or adjusted under 35 U.S.C. 154(b) by 92 days.

(21) Appl. No.: 17/901,468

(22) Filed: Sep. 1, 2022

(65) Prior Publication Data

US 2024/0077928 A1  Mar. 7, 2024

(51) Int. Cl.
*G06F 1/32* (2019.01)
*G06F 1/3212* (2019.01)
*G06F 1/324* (2019.01)

(52) U.S. Cl.
CPC ............ *G06F 1/324* (2013.01); *G06F 1/3212* (2013.01)

(58) Field of Classification Search
CPC .................................................... G06F 1/32
See application file for complete search history.

(56) References Cited

U.S. PATENT DOCUMENTS

| 2012/0166839 | A1 | 6/2012 | Sodhi et al. | |
|---|---|---|---|---|
| 2019/0332138 | A1* | 10/2019 | Bowles | G06F 1/3206 |
| 2021/0181822 | A1* | 6/2021 | Chen | G06F 1/3206 |
| 2023/0195198 | A1* | 6/2023 | Matsumura | G06F 1/3234 |
| | | | | 713/330 |

FOREIGN PATENT DOCUMENTS

WO  2017131667 A1  8/2017

OTHER PUBLICATIONS

International Search Report and Written Opinion—PCT/US2023/070707—ISA/EPO—Nov. 3, 2023.

* cited by examiner

*Primary Examiner* — Paul B Yanchus, III
(74) *Attorney, Agent, or Firm* — Loza & Loza, LLP/Qualcomm

(57) ABSTRACT

Aspects relate to a stepped clocking frequency mode for integrated circuit components. An apparatus includes a processor core configured to perform operations at a received clocking frequency and a clock controller. The clock controller is configured to clock the processor core with a default frequency in response to the processor core operating in a default mode of operation, and, responsive to a parameter value associated with the processor core exceeding a first threshold, to enter a stepped clocking frequency mode, that includes alternating between clocking the processor core at a first frequency for a first time interval, and clocking the processor core at a second frequency different than the first frequency for a second time interval.

29 Claims, 12 Drawing Sheets

STEPPED CLOCKING FREQUENCY MODE FOR INTEGRATED CIRCUIT COMPONENTS

INTRODUCTION

Aspects of the present disclosure relate generally to clocking frequencies for integrated circuit components and, in particular, to a stepped clocking frequency mode suitable for use with integrated circuits.

The performance of an integrated circuit (IC) is increased by increasing the clocking frequency applied to the circuit. The increased clocking frequency requires a corresponding increased operating voltage to ensure that the circuits operate correctly. For some IC components, different clock frequencies are mapped to different voltage corners so that the voltage is changed with the clocking frequency. The increased speed and voltage increase the heat that is generated by the circuit and the temperature of the circuits. Much of this increased temperature comes in the form of leakage current through the semiconductor structures of the IC. The leakage current reduces the efficiency of the IC and the maximum speed of the IC. The IC has a maximum temperature at which it can reliably operate.

ICs are typically operated well below the maximum steady-state clocking frequency and voltage in order to reduce power consumption and improve the longevity of the IC. A safety margin is also included in the default clocking frequency to account for variations in the production of each IC. Some ICs are equipped with a thermal mitigation system to reduce the clocking frequency when the IC becomes too hot. The thermal mitigation allows the IC to run faster in cool environments and forces the IC to run slower in hot environments. Some IC systems use a dynamic frequency adjustment that allows the IC to operate at a higher frequency and voltage for a short time to meet short term processing demands. For short bursts, an IC can safely operate at a higher clocking frequency than its steady-state clock speed. However, after the IC is heated, it must operate at a slower clocking frequency in order to cool back to a safe temperature.

Dynamic Voltage-Frequency Scaling (DVFS) is a technique for reducing power consumption by dynamically scaling changes in the applied voltage to changes in the applied clocking frequency. Voltage, current, load, utilization, or some combination are used as parameters for a decision to determine the voltage and clocking frequency that is most suitable under operating circumstances. DVFS is commonly used in cores of a processor, for example a central processing unit (CPU), a graphics processing unit (GPU), or a digital signal processor (DSP). The cores may be controlled individually or as a single unit. Dynamic clock voltage scaling (DCVS) is another technique that is used to adjust the frequency and voltage applied to an IC to deliver the needed performance at the ideal power level.

BRIEF SUMMARY

The following presents a summary of one or more implementations in order to provide a basic understanding of such implementations. This summary is not an extensive overview of all contemplated implementations and is intended to neither identify key or critical elements of all implementations nor delineate the scope of any or all implementations. Its sole purpose is to present some concepts of one or more implementations in a simplified form as a prelude to the more detailed description that is presented later.

In one example, an apparatus having a stepped clocking frequency mode for integrated circuit components is disclosed. The apparatus includes a processor core configured to perform operations at a received clocking frequency and a clock controller. The clock controller is configured to clock the processor core with a default frequency in response to the processor core operating in a default mode of operation, and, responsive to a parameter value associated with the processor core exceeding a first threshold, to enter a stepped clocking frequency mode, that includes alternating between clocking the processor core at a first frequency for a first time interval, and clocking the processor core at a second frequency different than the first frequency for a second time interval.

Another example provides a method that includes clocking a processor core at a default frequency in response to the processor core operating in a default mode of operation, and responsive to a parameter value associated with the processor core exceeding a first threshold, entering a stepped clocking frequency mode, that comprises alternating between clocking the processor core at a first frequency for a first time interval, and clocking the processor core at a second frequency different than the first frequency for a second time interval.

Another example provides an apparatus that includes means for clocking a processor core at a default frequency in response to the processor core operating in a default mode of operation, and means responsive to a parameter value associated with the processor core exceeding a first threshold, for entering a stepped clocking frequency mode, that comprises alternating between clocking the processor core at a first frequency for a first time interval, and clocking the processor core at a second frequency different than the first frequency for a second time interval.

To the accomplishment of the foregoing and related ends, the one or more implementations include the features hereinafter fully described and particularly pointed out in the claims. The following description and the annexed drawings set forth in detail certain illustrative aspects of the one or more implementations. These aspects are indicative, however, of but a few of the various ways in which the principles of various implementations may be employed and the described implementations are intended to include all such aspects and their equivalents.

DETAILED DESCRIPTION

Figure 1:
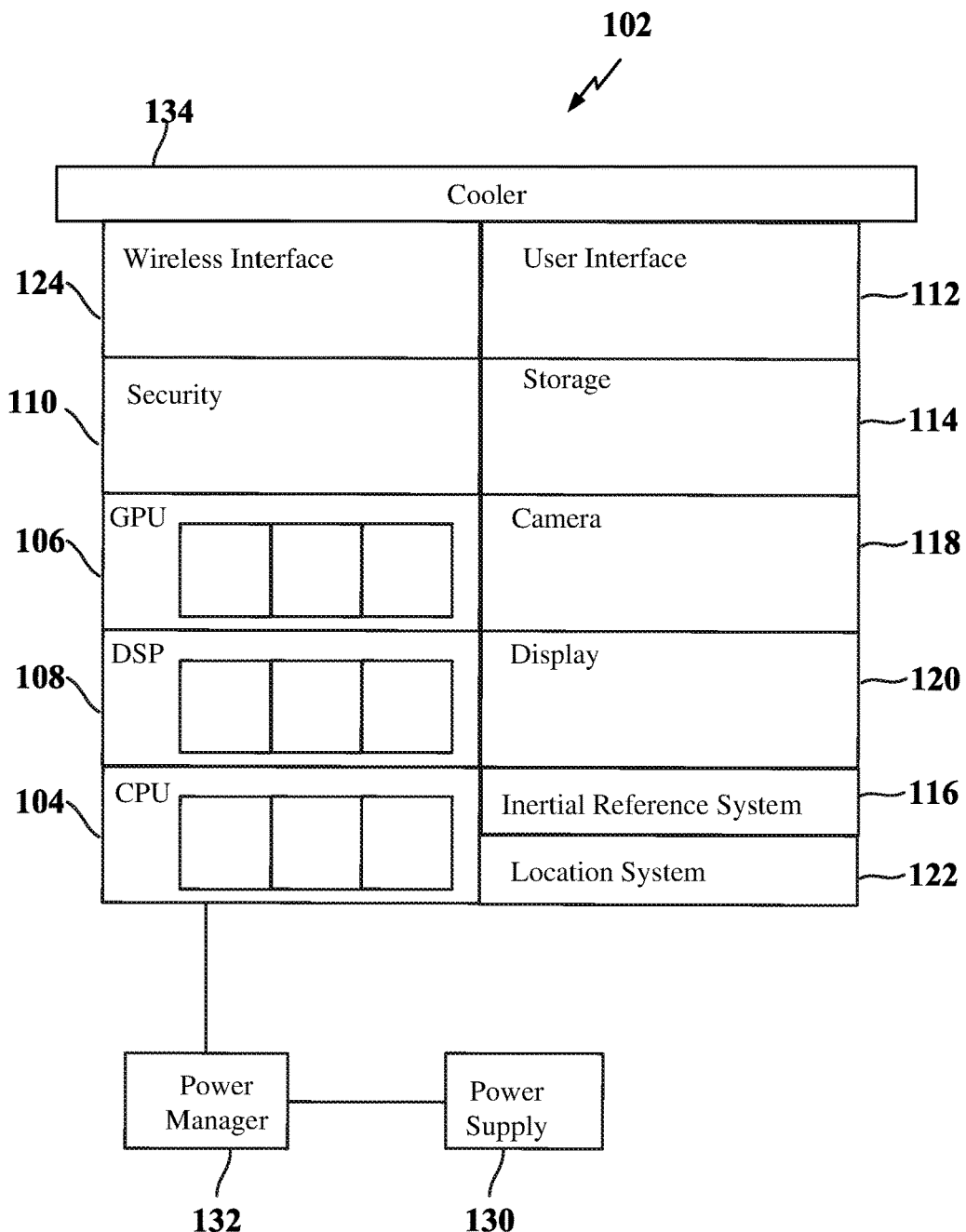
FIG. 1 illustrates a block diagram of a system on a chip, in accordance with certain aspects of the disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Aspects disclosed herein provide a stepped clocking frequency (SCF) mode to improve the performance of an IC. For example, the SCF mode described herein can delay thermal mitigation events and reduce power consumption. The SCF mode can be used as an extension of another power scaling technique, for example DFVS or DCVS. The SCF mode may also be used independent of other power scaling and clock throttling techniques. The SCF mode may be used for a single IC, a packaged processor, or for clocked components of a system on a chip (SoC), including a CPU and particular cores of a CPU. As described herein, in the SCF mode the clocking frequency may be configured to quickly vibrate between two or more frequency corners. The frequency corners may be mapped to corresponding different voltage corners. The SCF mode may allow an operation stack to be operated more quickly at lower overall temperature and power consumption.

An SCF mode may be used at slower clock frequencies to slow down a rate of thermal throttling in thermal mitigation. By reducing the thermal load on an IC, the SCF mode may prevent a thermal mitigation event from occurring. The frequency and voltage corners may be selected for different modes of operation, for example a high-performance mode, a high-efficiency mode, a battery saver mode, etc. The SCF mode may be applied to any clocked processor including processor cores for a CPU, GPU, or DSP, wireless controllers for Wi-Fi, cellular, or Bluetooth, special-purpose processor cores, such as for artificial intelligence (AI), video or camera processor cores, cache controllers, cache memory, such as Dynamic Random Access Memory (DRAM), and storage controllers.

In some examples, the SCF mode is applied for prolonged high-performance operation, for example a heavy workload that pushes the boundaries of the thermal cooling system. During a conventional heavy workload thermal management scenario, the processor pushes the frequency corner higher by increasing the clocking frequency incrementally until the processor hits a thermal threshold. The frequency is then pushed down by a thermal mitigation system. The processor frequency is driven at a lower than normal speed until the excess heat can be dissipated. In the SCF mode, the temperature thresholds are carefully balanced. If the processor operates more slowly, then the workload may take longer to execute and the processor may consume energy and generate heat for a longer time duration. On the other hand, if the processor is driven as fast as possible, then it may become overheated and, as a result, it may be operated at a lower speed for a longer time duration in order to dissipate the excess heat.

Using an SCF, the average frequency for a component over many steps may be configured higher than with a conventional default clocking frequency that is thermally mitigated. This provides higher performance for a steady-state operation of the component. The frequency steps may be configured to be both above and below the default frequency with the average speed being higher than the default frequency. The lower frequency step allows for the processor to cool, while the higher frequency step provides higher performance that ends before excess heat accumulates in the component. This can result in an overall power saving.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects or uses may come about via integrated circuit chip examples and other non-module-component based devices (for example, end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM (Original Equipment Manufacturer) devices or systems incorporating one or more aspects of the described innovations. In some practical settings, devices incorporating described aspects and features may also necessarily include additional components and features for implementation and practice of claimed and described aspects. For example, temperature and power sensors may use a number of components for analog and digital purposes (for example, hardware components including a power supply, a transducer, a detector, an accumulator, a digital to analog converter, etc.). It is intended that innovations described herein may be practiced in a wide variety of devices, chip-level components, systems, distributed arrangements, end-user devices, etc. of varying sizes, shapes, and constitution FIG. 1 is a block diagram of a system on a chip (Soc) suitable for use with a portable device or computer. The SoC 102 has a multiple core processor, such as a CPU 104, a multiple core graphics processor such as a GPU 106, a multiple core digital signal processor, such as a DSP 108, and a security module 110 that provides secret keys, device security, encryption, and decryption. The SoC 102 may also include a user interface 112 coupled to external components, such as a touchscreen, keyboard, buttons, etc. The SoC shown in FIG. 1 further includes mass storage 114, an inertial reference unit 116, a camera, a display driver, and position sensors 122, such as a satellite positioning system. In addition, the SoC may include a wireless interface 124 that couples to analog radio frequency components and antennas (not shown) to support wireless data and control interfaces.

Each of the components is coupled through a bus (not shown) or through the CPU 104 and more or fewer components may be used to suit particular applications. As an alternative to the SoC 102, as shown, any one or more components may be manufactured on separate chips and packaged together or separately.

A system including the SoC 102 is coupled to a power supply 130, such as a battery, or mains converter that is coupled to the SoC 102 through a power manager 132 that may be on the chip or a discrete component. The power manager 132 regulates the power of the components of the SoC 102 and controls operating clock frequencies and voltages applied to the components of the SoC 102. The power manager 132 further controls the voltage applied to the SoC and is also able to measure the battery charge level of the power supply.

The cores of the CPU 104, GPU 106, and other components, such as the mass storage 114 and wireless interface 124, among others may include or be fitted with thermal sensors and power sensors, in the form of voltage sensors, current sensors, or both. The sensors provide information to the power manager 132 for the regulation of frequency and voltage provided to the components. The power manager 132 may include clocking circuits and voltage regulators among other components as described in more detail below. In some examples, the CPU 104, GPU 106, and other clocked components may also include a power manager circuit or software to determine appropriate clocking frequencies and voltages. The determined clocking frequencies and voltages may be sent to the power manager 132 for application or the clocked component may adjust clocking frequencies and voltages independent of the power manager 132. An SCF mode may be implemented by the power manager or independently in a processor or processor core.

Figure 2:
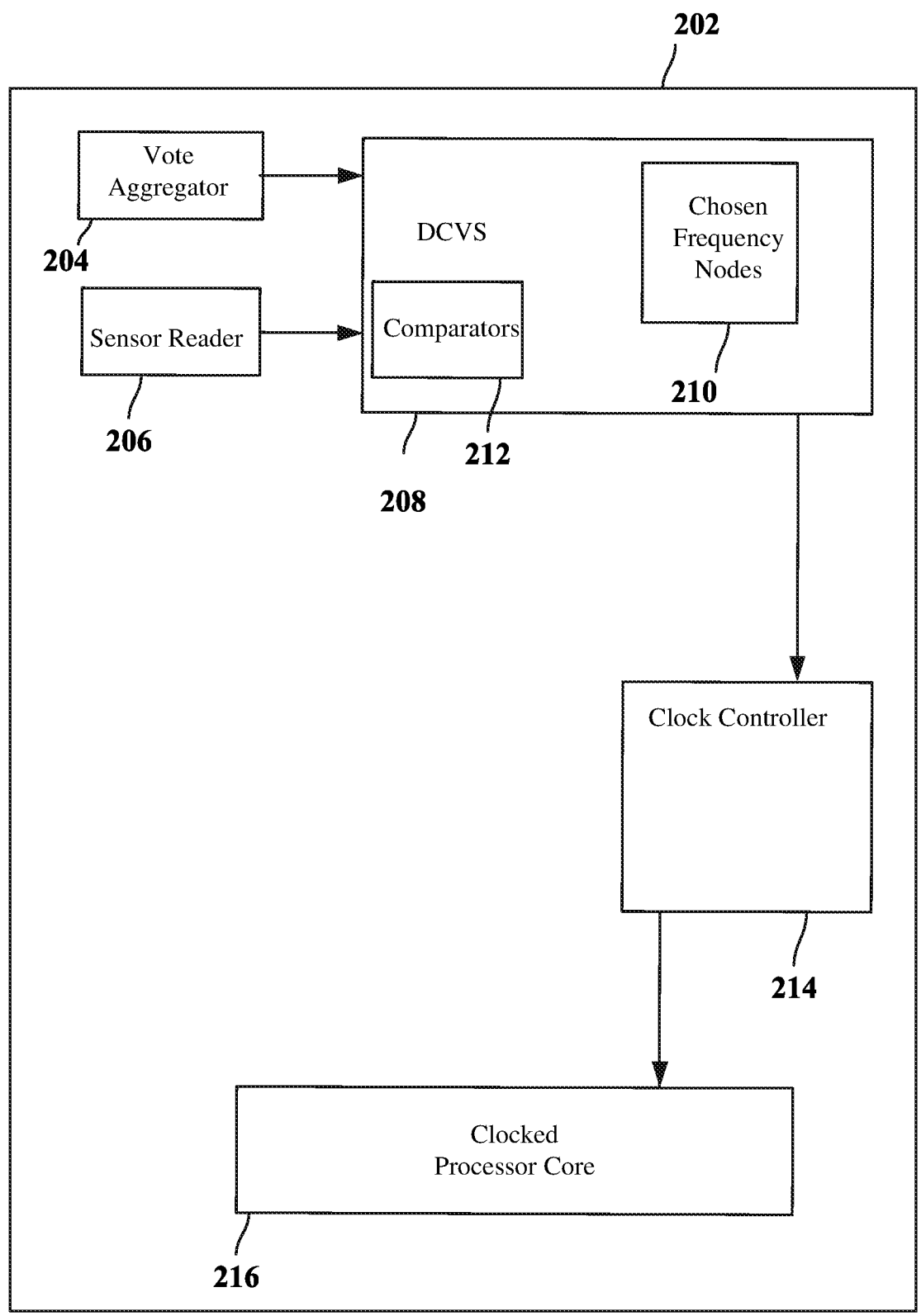
FIG. 2 illustrates a hardware block diagram of a processor with DCVS to control the clocking of a component.

FIG. 2 illustrates a hardware block diagram of a processor 202 with a Dynamic Clock Voltage Scaling (DCVS) circuit 208 to control the clocking of a clocked component 216, for example a clocked processor core. The processor 202 may contain many more components that are not shown here in order to simplify the description. The DCVS circuit 208 attempts to optimize power consumption of the clocked component 216 while maintaining acceptable performance levels. A vote aggregator 204 is coupled to various clients (not shown) to receive and aggregate votes. The votes may include operating system scheduler status, application performance logs including application startup and shutdown, anticipated application processing demand, and bandwidth votes from the clients. The aggregated votes indicate the utilization of the clocked component and may also indicate an anticipated utilization of the clocked component. This may be based, for example, on application status and bandwidth votes. Additional parameters other than votes may also be used to determine the utilization or load of the clocked component. The additional parameters may be used instead of or in addition to the votes. All of these parameters may be aggregated in the vote aggregator 204.

A sensor reader 206 reads measured values from any connected sensors that may include frequency, temperature and battery charge level sensors. The vote aggregator 204 and the sensor reader 206 are coupled to the DCVS circuit 208 of the processor 202 that predicts optimal clock frequency and voltage settings based on current or expected performance demands. The DCVS circuit 208 receives these inputs and includes a table of frequency nodes 210 (also referred to herein as frequency points or frequencies) of the clock controller 212 and selects a higher or lower clocking frequency node. The selected frequency node is provided to a connected clock controller 214 to change the clocking frequency of the clocked component 216, for example a processor core. The table of frequency nodes 210 may also include corresponding voltages so that the clock controller, directly or indirectly, controls the voltage change. Each frequency node may have a different corresponding voltage or the same corresponding voltage as another frequency node.

A DCVS technique may be performed by an application-specific integrated circuit (ASIC) or in software executed in a programmable processor. A single DCVS ASIC or program may be shared between more than one clocked component 216.

The clocking frequency may also be controlled by a thermal mitigation technique. Thermal mitigation may be executed by a DCVS circuit or as a separate system. While DCVS attempts to optimize power consumption of the clocked component, thermal mitigation throttles the clocking frequency to prevent the clocked component from becoming too hot. In examples, thermal mitigation is coupled to a temperature sensor that measures a temperature value associated with the clocked component. When the temperature exceeds a threshold, then the thermal mitigation technique reduces the clocking frequency by some value or some percentage to reduce the heat generated by the clocked component. More complex techniques may be used and the clocking frequency reduction may be connected to work with a DCVS technique.

Figure 3:
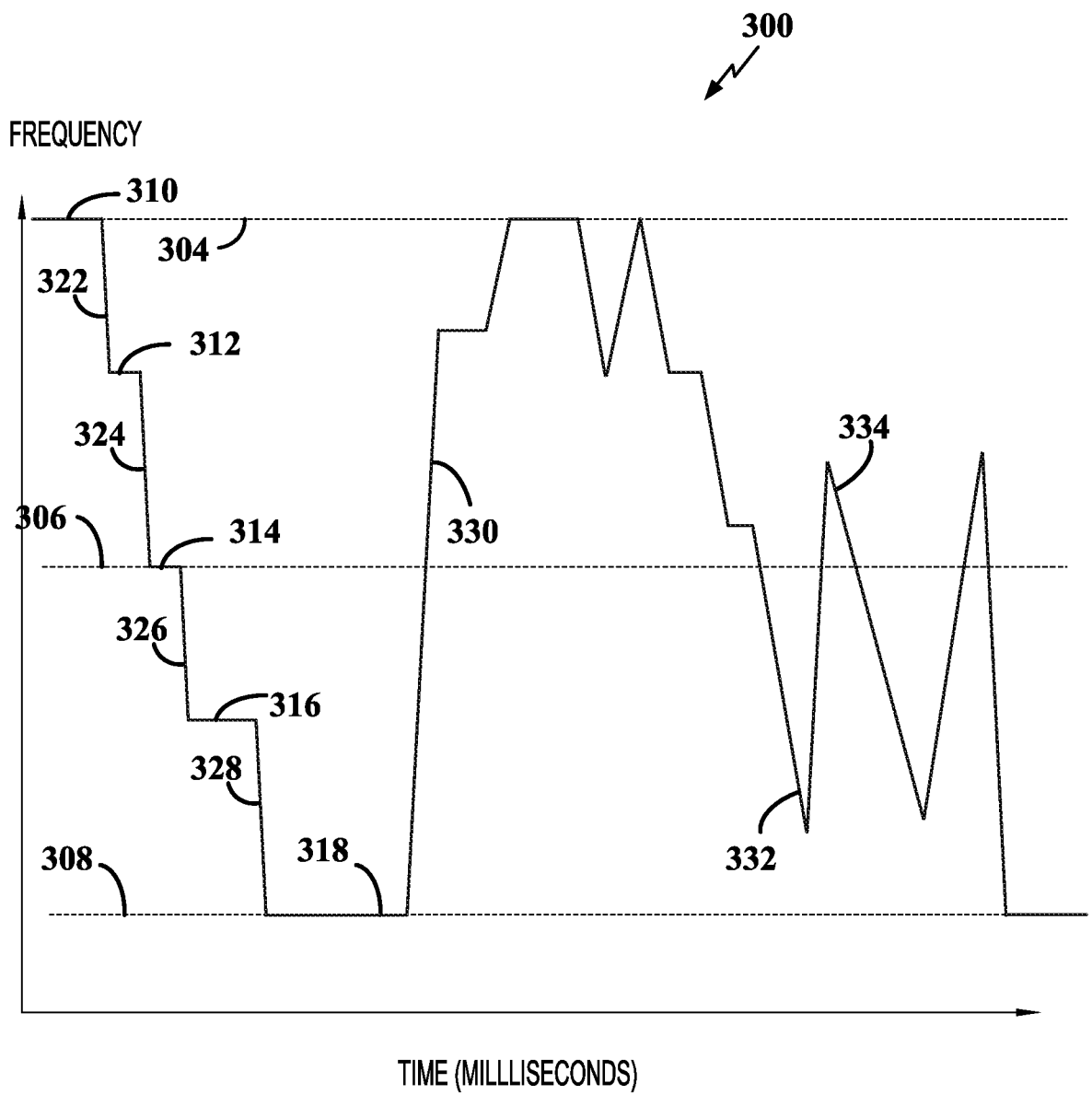
FIG. 3 illustrates a graph of a DCVS clocking frequency pattern.

FIG. 3 illustrates a graph of a DCVS clocking frequency pattern 300. For reference, the graph shows a high clocking frequency value 304, an intermediate clocking frequency value 306, and a low clocking frequency value 308. The clocked frequency of the processor is depicted on the vertical axis against time on the horizontal axis. The pattern begins with the clocked component at the high clocking frequency value for some duration 310. This is typical for a startup sequence, however, the clocked component may begin at any clocking frequency value. The DCVS circuit then reduces the clocking frequency. The DCVS may determine that less processing performance is required based on results of the vote aggregator or that the processor core is too hot based on results of the sensor reader and then reduces the received clocking frequency and the received voltage at the processor core to prevent the processor core from overheating. This may be performed by a thermal mitigation system of the processor without regard to the vote aggregator in order to protect the processor core from a thermal overload. The DCVS circuit reduces the clocking frequency with a first down time ramp 322 to a second lower clocking frequency duration 312. This is followed by a second down time ramp 324 to a third lower clocking frequency duration 314 at the intermediate clocking frequency value 306, a third down time ramp 326 to a fourth lower clocking frequency duration 316, and a fourth down time ramp 328 to a fifth lower clocking frequency duration 318 at the low clocking frequency value 308. The particular pattern of clocking frequency changes is determined by the DCVS or thermal mitigation or both based on the inputs, as shown in FIG. 2 and may vary over time. The pattern of FIG. 3 is provided only as an example of possible clocking frequency changes.

When DCVS is combined with thermal mitigation, the DCVS circuit will reduce the clocking frequency and voltage to protect the processor core from a thermal overload. If the processor core is not too hot and there is high utilization or high anticipated utilization, then the DCVS circuit increases the clocking frequency and voltage of the processor core. With aggregated votes for higher performance, there may be an up time ramp 330 to a much higher clocking frequency duration followed by still more up time ramps. Depending on the votes and the sensor values, there may be many lows 332 and highs 334 in the pattern 300 in rapid succession. The clocking frequency values and the durations at each clocking frequency value are not tied to any particular values and the pattern is not regular or predictable. In this default mode of operation, the performance of the core is matched to the votes and limited to the thermal capability of the clocked component. For a clocked component with DCVS the pattern of FIG. 3 is the default frequency. For a clocked component with thermal mitigation separate from DCVS, any one or more of the peaks may be lowered to mitigate thermal overload of the clocked component.

DCVS attempts to optimize power consumption of the clocked component. However, when high performance operation is required, for example for heavy workloads or low latency, DCVS will allow the clocked component to operate at a high clocking frequency. As the clocked component heats, thermal mitigation may be triggered reducing the intended high performance operation. High performance operation also increases power consumption. Similarly for low power operation, high latency may be caused by a low clocking frequency. Various aspects provide an SCF technique that enables the clocking frequency to vibrate between at least two frequency nodes (e.g., frequency points or frequencies). By vibrating between the two frequency points with a period on the order of milliseconds, the user does not perceive any latency. A stepped clocking frequency provides low latency with only slightly reduced performance. The high frequency level allows workloads to be processed quickly, while the lower frequency level allows the clocked component to cool. The duty cycle of the clocked component can be significantly reduced to provide lower power consumption and reduce the heat generated.

The SCF mode is suitable for boundary conditions and for prolonged operating circumstances, for example, prolonged power demands that may be subjected to thermal mitigation. One such example is a heavy workload that is crossing the boundary to demonstrate a key performance indicator. A sufficiently heavy workload that is pushing the operational frequency corner higher one notch at a time and pushing the system's limits for power or thermal cooling, will start hitting thresholds of maximum performance. A thermal mitigation system will reduce the clocking frequency and voltage to protect the processor core from an overload. By entering an SCF mode at a lower temperature, the thermal limits can be protected to avoid the operation of the thermal mitigation system with only a small performance loss compared to a DCVS system.

Figure 4:
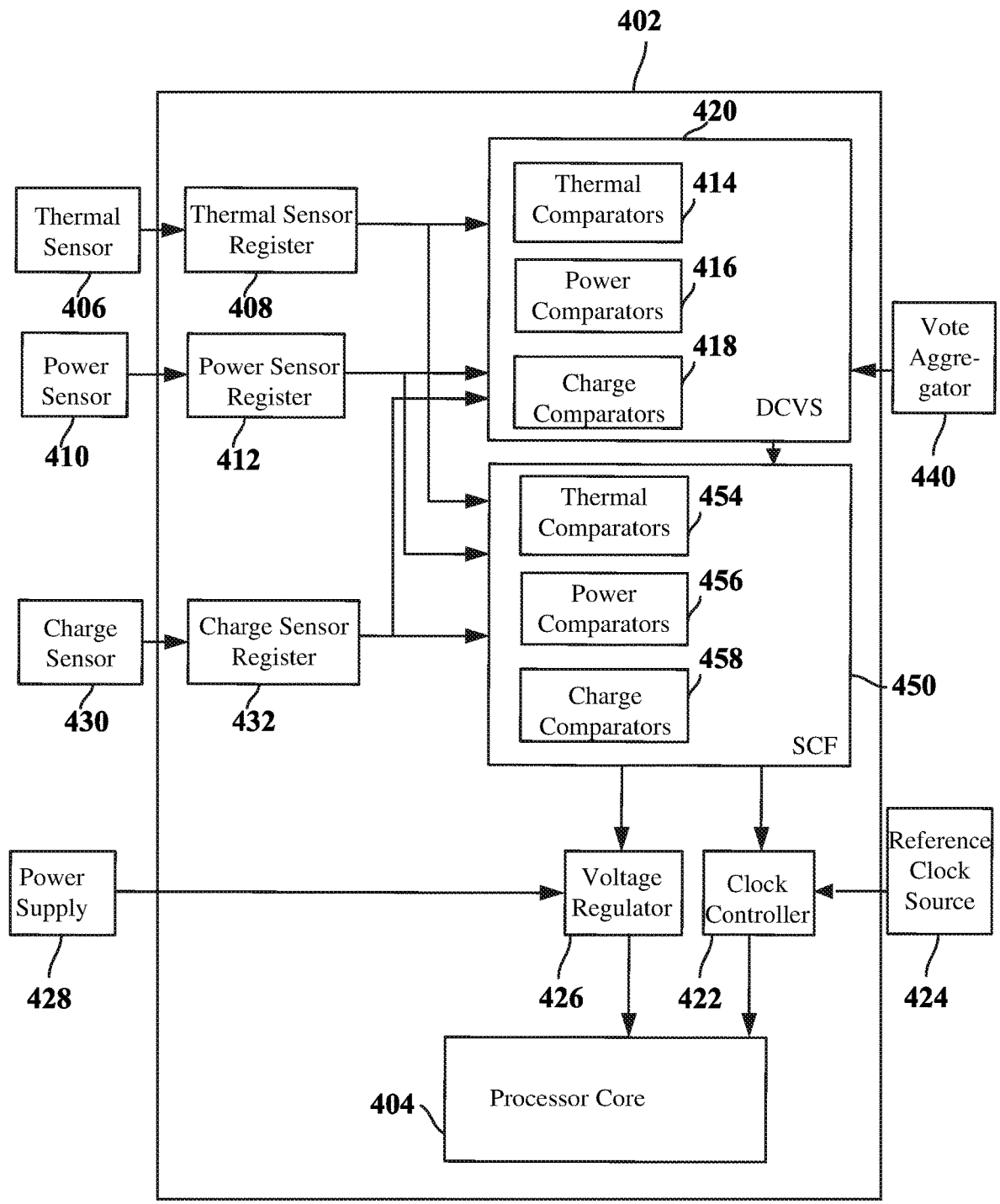
FIG. 4 illustrates a hardware block diagram of clock controller for clocking a component, in accordance with certain aspects of the disclosure.

FIG. 4 is a hardware block diagram of a processor 402 that includes a clocked component, such as a processor core 404 or a controller. Such a processor may be one of the processing units 106, 108, 104 of FIG. 1, the processor 1120 of FIG. 11 or any other suitable clocked component. The processor 402 includes a DCVS circuit 420, as described above with respect to FIGS. 2 and 3, and a stepped clocking frequency circuit 450. In the example shown in FIG. 4, the clocked component is a processor core 404. The core may be a part of a CPU, GPU, DSP, or any other clocked component. While only one processor core is shown, there may be multiple processor cores. The processor core 404 is configured to perform operations at a received clocking frequency. The clocking frequency is received from a clock controller 422 of the processor 402.

The processor 402 receives temperature values corresponding to measured temperatures from a thermal sensor 406 and power values corresponding to measured power from a power sensor 410 and further regulates the voltage and clocking frequency of the processor core 404 based, at least in part, on the temperature values and the power values. In addition to temperature and power, other parameters may be measured and these parameter values may be provided to corresponding parameter registers for comparison to appropriate parameter thresholds. In some examples, the thermal sensor 406 measures the temperature of the processor core 404. The thermal sensor may also measure temperatures of other components, such as the main core, an interface, or a cooler of the processing core. The thermal sensor 406 is coupled to a thermal sensor register 408 of the processor 402. The thermal sensor register 408 is a parameter register configured to store temperature values that are measured by the thermal sensor. In some examples, the thermal sensor 406 can send a temperature value to the thermal sensor register 408 for storage therein. In some examples, the thermal sensor register 408 may read or ping the thermal sensor 406 to obtain a temperature value. There may be multiple temperature values in the thermal sensor register 408 with associated timestamps. In addition, there may be multiple thermal sensors to determine temperatures at multiple locations.

The power sensor 410 measures a power of the processor core and the measured power values are stored in a power sensor register 412 of the processor 402. The power sensor register 412 is a parameter register for a variety of representations of the power being used by or provided to the processor core 404. The power may be represented by forms of a voltage, a current, a wattage, or another power measurement. The power sensor 410 is coupled to the power sensor register 412 to store the measured power values in the power sensor register 412. In some examples, the power sensor 410 can send a power value to the power sensor register 412. In some examples, the power sensor register 412 can read or ping the power sensor 410 to obtain a power value. There may be multiple power values in the power sensor register 412 with associated timestamps. In addition, there may be multiple power sensors 410 to determine power values at multiple locations and with multiple measures of the power, for example volts, amps, watts, reactance, etc.

In some examples, the power supply 428 is or includes a battery. A charge sensor 430 measures the battery charge level and stores a value of the battery charge level in a battery charge sensor register 432. When the battery charge level is less than a battery charge level threshold, as determined by an SCF charge comparator 458, the processor 402 may enter an SCF mode in response, as described below. This operates to conserve battery power until the battery is charged and the battery charge level is more than the battery charge level threshold.

Within the DCVS circuit 420, the thermal sensor register 408 is coupled to a DCVS thermal comparator 414. The DCVS thermal comparator 414 is coupled to the DCVS circuit 420. The DCVS thermal comparator 414 compares the stored temperatures in the thermal sensor register 408 to programmed thresholds and generates comparator results to the DCVS circuit 420. The power sensor register 412 is coupled to a DCVS power comparator 416 that is also coupled to the DCVS circuit 420. The DCVS power comparator 416 compares power values in the power sensor register 412 to programmed thresholds to generate power comparator results. The power comparator results are provided to the DCVS circuit 420. A DCVS charge comparator 418 is also coupled to the DCVS circuit 420 to provide battery charge level results. In some examples, a vote aggregator 440 is coupled to the DCVS circuit 420 for use by the DCVS circuit 420 to optimize power consumption for the current or anticipated utilization of the processor core. There are different implementations of DCVS that use different inputs to optimize power consumption. The described implementation is provided only for context. The SCF circuit may be adapted to suit any such implementation and may also be integrated with DVFS (instead of DCVS) or operated independently of DVFS or DCVS or without any such clock scaling system (e.g., the processor 400 may include no DCVS or DVFS circuit.

Within the SCF circuit 450, the thermal sensor register 408 is coupled to an SCF thermal comparator 454. The SCF thermal comparator 454 is coupled to the SCF circuit 450. The SCF thermal comparator 454 compares the stored temperatures in the thermal sensor register 408 to programmed thresholds and generates comparator results to the SCF circuit 450. The power sensor register 412 is coupled to an SCF power comparator 456 that is also coupled to the SCF circuit 450. The SCF power comparator 456 compares power values in the power sensor register 412 to programmed thresholds to generate power comparator results. The power comparator results are provided to the SCF circuit 450. An SCF charge comparator 458 is also coupled to the SCF circuit 450 to provide battery charge level results.

The DCVS circuit 420 and the SCF circuit 250 are coupled to a clock controller 422 to control the clocking frequency and to a voltage regulator 426 to control the voltage provided to the processor core 404. In some examples, the clock controller 422 may receive a reference clock from an internal or external reference clock source 424 and then select or modify the reference clock to drive the processor core 404 at a received clocking frequency as determined by the DCVS circuit 420 and the SCF circuit 450. Similarly, the voltage regulator 426 may receive power from a power supply 428 and select or modify the received power to provide a voltage to drive the processor core 404 at a received voltage as determined by the DCVS circuit 420 and the SCF circuit 450.

Accordingly, the clocking frequency and the voltage of the processor core are regulated by the DCVS circuit 420 of the processor 402 in accordance with measurements from the thermal sensor 406 and the power sensor 410, and in some circumstances using results from the vote aggregator 440. The processor 402 includes a DCVS circuit 420, as described above with respect to FIGS. 2 and 3 and an SCF circuit 450, as described in more detail below. The DCVS circuit 420 and the SCF circuit 450 are components that control the operation of the clock controller 422, as described herein, provide thermal protection, and are able to optimize performance of the processor core for particular operational circumstances. More or fewer components may be used to suit different applications. In some examples, only a thermal sensor or only a power sensor are used. In some aspects, other sensors are used instead of or in addition to the thermal sensor and the power sensor. The DCVS circuit 420 may use the same or different sensors as compared to the SCF circuit 450.

In FIG. 4, the DCVS circuit 420 sends clock and voltage commands to the clock controller 422 and the voltage regulator 426 through the SCF circuit 450. The allows the SCF circuit 450 to interrupt a command from the DCVS circuit 420 and cause the processor core to enter the SCF mode. Alternatively, the SCF circuit 450 may send commands through the DCVS circuit 420 or the two may operate independently. The SCF circuit 450 may operate as an extension to the DCVS circuit 420. In some examples, the SCF circuit 450 operates independently of the DCVS circuit 420. In some examples, the DCVS circuit 420 selects a frequency point for the processor core 404. When that frequency point drives the clocked component to a temperature or power that is within the entry and exit thresholds of the SCF circuit 450, then the SCF circuit enters the corresponding SCF mode. When the clocked component, even in SCF mode, reaches a temperature or power that is above or below the entry and exit thresholds of the SCF circuit 450 then the SCF circuit 450 exits the SCF mode. While the description is presented with DCVS, examples herein may be adapted to use DVFS instead of DCVS, simple thermal mitigation, or other clocking frequency methodologies. Alternatively, SCF may be used without any of these other methodologies.

Figure 5:
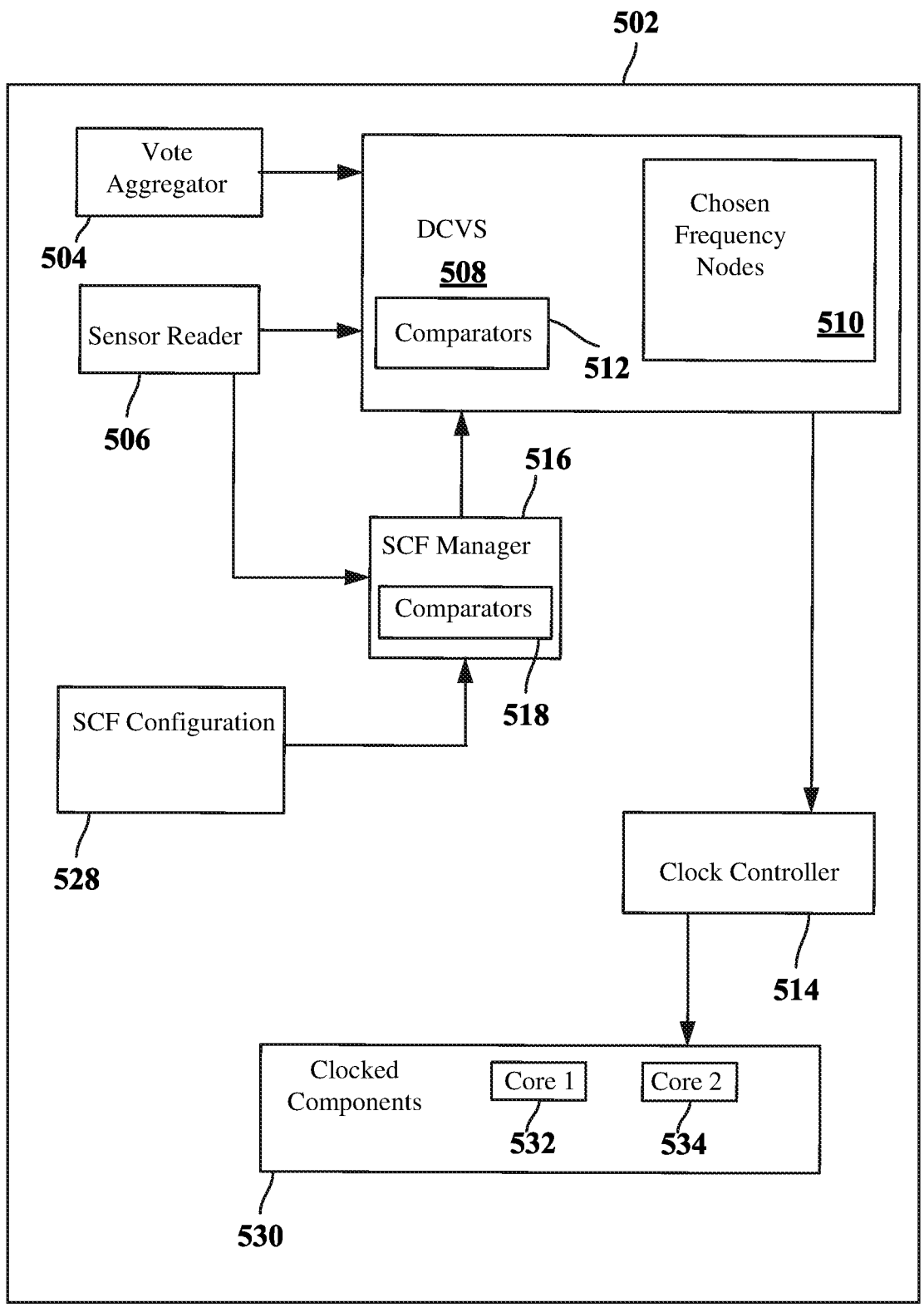
FIG. 5 illustrates a functional block diagram of clock controller for clocking a component, in accordance with certain aspects of the disclosure.

In some aspects, the DCVS circuit 420 operates using a time rate of change of the temperature and power as determined from the thermal comparators and the power comparators. As an example, in some aspects, the parameter associated with the processor core is a rate of temperature increase of the processor core. This may be combined with the current temperature or used independent of the temperature. In some aspects, the parameter is a combination of a temperature or rate of temperature increase of the processor core and a power applied to the processor core FIG. 5 is a functional block diagram of a processor 502 that includes a clock controller 514 coupled to a DCVS module 508 and an SCF manager 516. The functional block may be implemented as software on a general purpose processor, or as firmware on an application specific IC, or in other ways. The processor 502 includes one or more clocked components 530, for example a first clocked core 532, and a second clocked core 534. The processor 502 includes a vote aggregator 504 that is coupled to the DCVS module 508 of the of the processor 502. A sensor reader 506 is also coupled to the DCVS module 508. The vote aggregator 504 collects votes from various clients about the current and anticipated operational condition of the processor core including votes regarding utilization, buffer queues, workloads, and other anticipated demands on the processor core. The vote aggregator 504 aggregates this information and then provides it to the DCVS module 508. The sensor reader 506 collects information about temperature, power, battery charge level, and other environmental conditions of the processor core and provides this information to the DCVS module 508. The sensor reader 506 may also analyze the sensor readings using comparators, aggregators, combiners, or other functional blocks.

The DCVS module 508 operates in a default mode of operation to adjust the clocking frequency and voltage that are applied to each processor core. The DCVS module 508 compares the values from the vote aggregator 504 and sensor reader 506 to various thresholds using comparators 512 of the DCVS module 508. Based on the comparisons, the DCVS module 508 determines an optimal clocking. If the DCVS module 508 includes thermal mitigation, then, at high temperatures, the clocking frequency will be reduced to prevent the processor core from overheating. If the processor core is not too hot and there is high utilization or anticipated high utilization, then the DCVS module 508 increases the clocking frequency and voltage of the processor core in the default mode of operation. The DCVS module includes a table of frequency nodes 510 (e.g. frequency points or frequencies) and selects a higher or lower clocking frequency node in response to higher or lower utilization or anticipated utilization. The selected frequency node is provided to a connected clock controller 514 to provide a change in the clocking frequency of the processor core. The table of frequency nodes 510 can also include corresponding voltages so that the clock controller 514 also commands a corresponding voltage change.

The processor 502 also allows for a stepped clocking frequency (SCF) configuration 528 that is coupled to an SCF manager 516 of the clock controller 514. The SCF configuration 528 may be within the SCF manager 516 or in a separate memory store. In some examples, the SCF manager 516 is coupled to the DCVS module 508 of the processor 502 to cause the first clocked core 532 or the second clocked core 534 of the clocked components 530 to enter and to exit an SCF mode. In some examples, the SCF manager 516 operates independently of the DCVS module 508. In the illustrated example, the SCF manager 516 is coupled to the DCVS module 508 and operates through the DCVS module 508.

The SCF configuration 528 may have a first entry and exit threshold for the first core and a second entry and exit threshold for the second core. As an example, the first temperature threshold may be higher than the second temperature threshold. The second processor core may be a low power core so that when the second processor core temperature exceeds the second temperature threshold, the second processor core enters a second SCF mode at a lower temperature. In other examples, the SCF manager 516 may operate without a DCVS module 508 or independent of a DCVS module 508. The SCF manager 516 receives sensor information from the sensor reader 506, such as representations of temperature and power and applies this information to SCF comparators 518 that include the entry and exit thresholds. The SCF manager 516 uses the comparisons to determine whether to enter and exit the SCF mode. The SCF configuration 528 includes thresholds for determining whether to enter or exit an SCF mode. The SCF configuration 528 also determines the parameters of each SCF mode, such as the frequencies, or frequency points, and the time intervals. By controlling each core separately, if the system is running a single threaded task and needs maximum performance from only one core, then only one core is operated at high voltage while the others remain in a low power state until needed. This reduces power consumption and allows the thermal cooler to more easily remove the reduced amount of heat generated by the processor as a whole.

Figure 6:
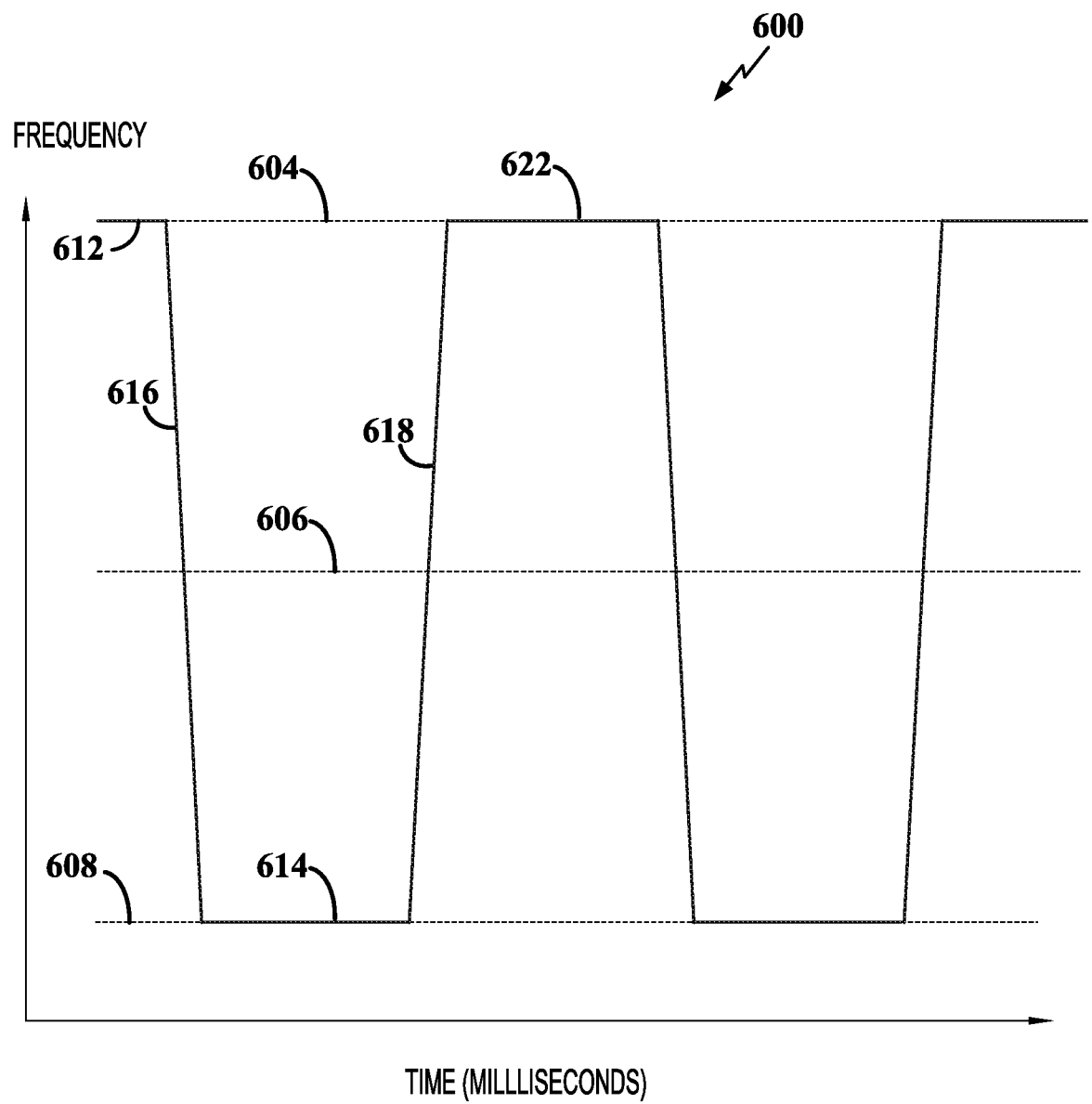
FIG. 6 illustrates a graph of a stepped clocking frequency mode pattern, in accordance with certain aspects of the disclosure.

FIG. 6 is a graph of an SCF mode pattern. The clocking frequency of a clocked component, for example, a first clocked core 532 or a second clocked core 534 of FIG. 5, is depicted on the vertical axis against time on the horizontal axis. The pattern 600 has a high clocking frequency value 604, an intermediate clocking frequency value 606, and a low clocking frequency value 608. The pattern has a high frequency duration 612 during which the pattern is at the high clocking frequency value 603 and a low frequency duration 614 during which the pattern is at the low clocking frequency value 608. There is also a down time ramp 616 from the high clocking frequency value 604 to the low clocking frequency value 608 and an up time ramp 618 from the low clocking frequency value 608 to the high clocking frequency value 604. The cycle repeats with a second high frequency duration 622 at the high clocking frequency value 604, another down time ramp, and so on. The slopes of these ramps may be configured to accommodate the reaction time of the clocked component without affecting reliability and accuracy of the operations of the component.

While the high frequency duration 612 and the low frequency duration 614 are shown as being about the same duration, the durations may be different. Using a low frequency duration 614 that is shorter than the high frequency duration 612 allows the clocked component to operate at a cooler temperature than an average clocking frequency between the high clocking frequency value 604 and the low clocking frequency value 608. For a typical ramp slope, even with equal time durations, the clocked component operates at the high clocking frequency value less than half of the time, for example about 40% of the time, resulting in a significant reduction in heat generation and corresponding losses.

The pattern 600 repeats through time from left to right and a full cycle has one high frequency duration 612 and one low frequency duration 614 in each cycle. The pattern may be defined by the two frequency points and the two durations. The definition may also include the slope of the ramps between each frequency point or a default slope may be used. The voltage at each frequency point may be fixed for this pattern or by default so that the voltage that is applied to the clocked component by the voltage regulator is determined based on the clocking frequency. This simple two-frequency pattern provides improved performance as compared to a fixed clocking frequency whether at the intermediate clocking frequency value 606 or the low clocking frequency value 608. The high clocking frequency value 604 may be too high for the clocked component to sustain within its thermal envelope. The low clocking frequency duration allows the clocked component to perform at the higher level in bursts. When the pattern is used in a low battery mode, a two-frequency pattern may be used with lower clocking frequency values to provide higher performance than a typical low battery mode while still reducing power consumption. An SCF configuration 528 may include multiple SCF patterns to suit different circumstances, for example, high performance, standard use, and low battery.

Figure 7:
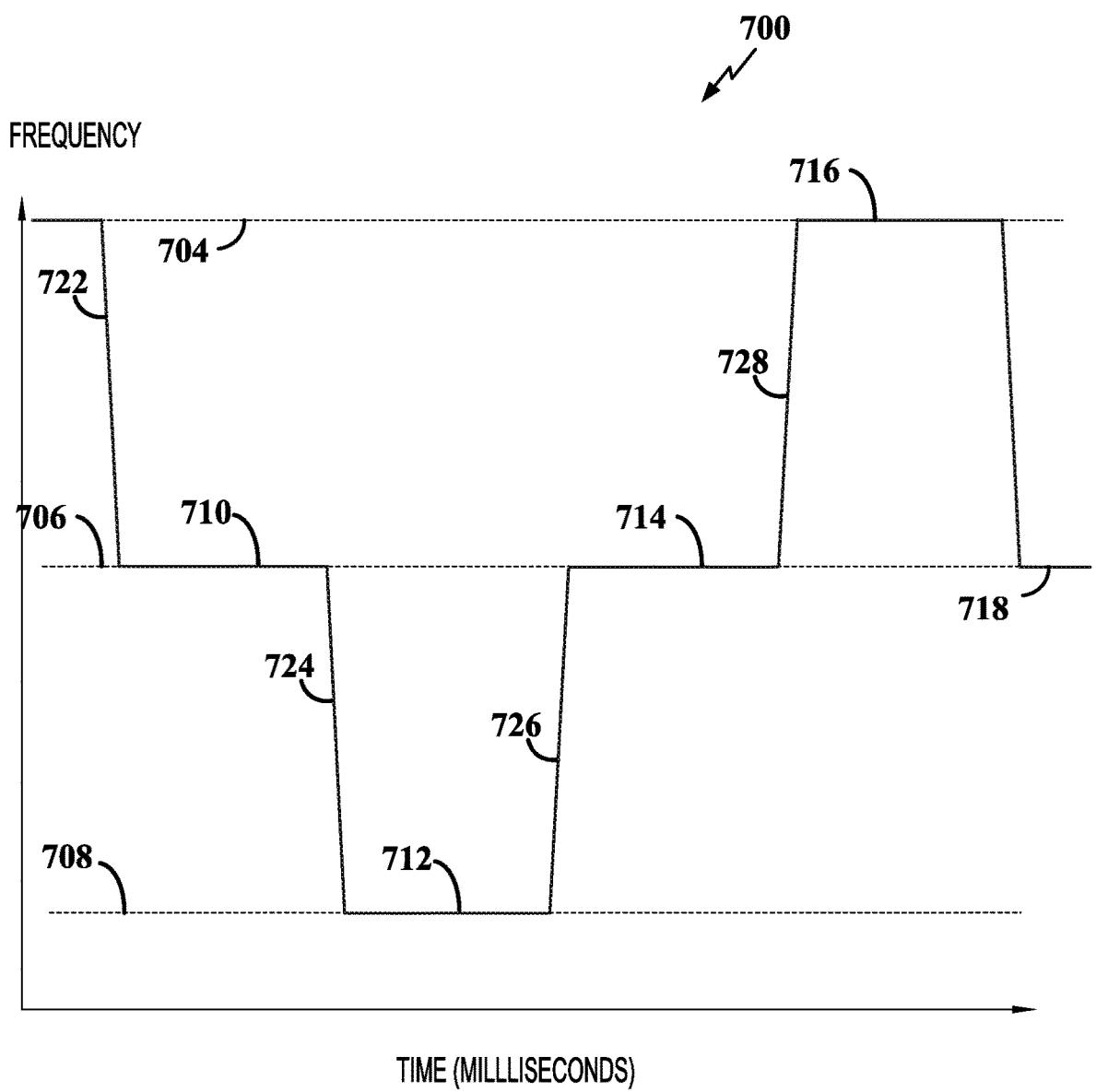
FIG. 7 illustrates a graph of a second stepped clocking frequency mode pattern, in accordance with certain aspects of the disclosure.

FIG. 7 is a graph of a second SCF mode pattern. The pattern 700 has a high clocking frequency value 704, an intermediate clocking frequency value 706, and a low clocking frequency value 708. The pattern has a first intermediate frequency duration 710 during which the pattern is at the intermediate clocking frequency value 706, a low frequency duration 712 during which the pattern is at the low clocking frequency value 708, a second intermediate frequency duration 714 during which the pattern is at the intermediate clocking frequency value 706 for a second time, and a high frequency duration 716 during which the pattern is at the high clocking frequency value 704. The pattern repeats with a third intermediate frequency duration 718 during the next cycle of the pattern. This pattern shows three frequency points that correspond to the three clocking frequency values 704, 706, 708.

There is also an upper down time ramp 722 from the high clocking frequency value 704 to the intermediate clocking frequency value 706 and a lower down time ramp 724 from the intermediate clocking frequency value 706 to the low clocking frequency value 708. At the upward side of the cycle there is a lower up time ramp 726 from the low clocking frequency value 708 to the intermediate clocking frequency value 706 and an upper up time ramp 728 from the intermediate clocking frequency value 706 to the high clocking frequency value 704. The slopes of these ramps may be configured to accommodate the reaction time of the clocked component without affecting reliability and accuracy of the operations of the component.

In the pattern 700 shown in FIG. 7, all of the clocking frequency durations are equal and the slopes of the ramps are equal. This regular three-frequency pattern may be used instead of the two-frequency pattern of FIG. 6 or for certain circumstances. An SCF configuration may include patterns with two, three or more frequencies to suit different circumstances as determined by an SCF manager. Any one of the durations may be shorter or longer than the other to suit particular implementations. In addition, a first duration may be different from a second duration. For example, the first intermediate frequency duration 710 may be longer or shorter than the second intermediate frequency duration 714. The slopes of the ramps may be modified as well as the number of different frequency values and the order in which each frequency value is used. The illustrated patterns are provided as examples and the patterns may be modified or other patterns may be used.

Figure 8:
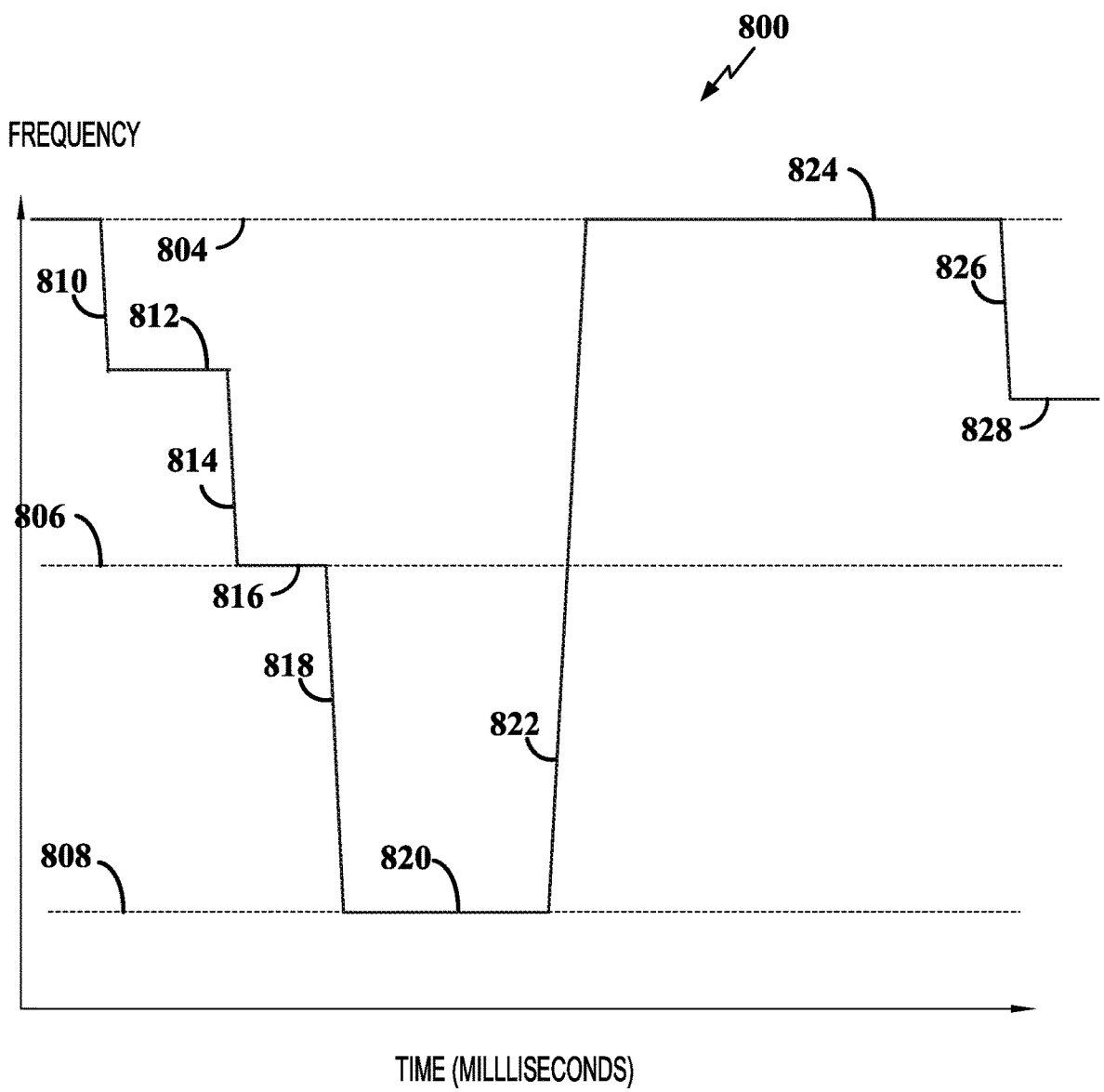

FIG. 8 is a graph of a third SCF mode pattern for which the clocking frequency durations are not equal. The pattern 800 has a high clocking frequency value 804, an intermediate clocking frequency value 806, and a low clocking frequency value 808. The pattern has a first intermediate frequency duration 812 during which the pattern is above the intermediate clocking frequency value 806, a second intermediate frequency duration 816 during which the pattern is at the intermediate clocking frequency value 806, and a low frequency duration 820 during which the pattern is at the low clocking frequency value 808. The pattern then rises to a second high frequency duration 824 during which the pattern is at the high clocking frequency value 804 for a second time, and a third intermediate frequency duration 828 during which the pattern is between the high clocking frequency value 802 and the intermediate clocking frequency value 806. This third SCF pattern 800 has five different clocking frequency values and the time at each value is different from the time at each other value. A full cycle of the pattern is not shown, but the cycle may include several more transitions before the next repeat.

There is also a first upper down time ramp 810 and a second upper down time ramp 814 from the high clocking frequency value 804 to the intermediate clocking frequency value 806 and a lower down time ramp 818 from the intermediate clocking frequency value 806 to the low clocking frequency value 808. At the upward side of the cycle there is an up time ramp 822 from the low clocking frequency value 808 to the high clocking frequency value 804. A further down time ramp 826 connects the second high frequency duration 824 to the third intermediate frequency duration 828. The slopes of these ramps may be different from each other and configured to accommodate the reaction time of the clocked component and other factors. The third SCF pattern is provided as an example of possible variations to the simpler two-frequency and three-frequency patterns described above. Other modifications and variations may be made to the illustrated patterns to suit different clocked components and operational circumstances.

Figure 9:
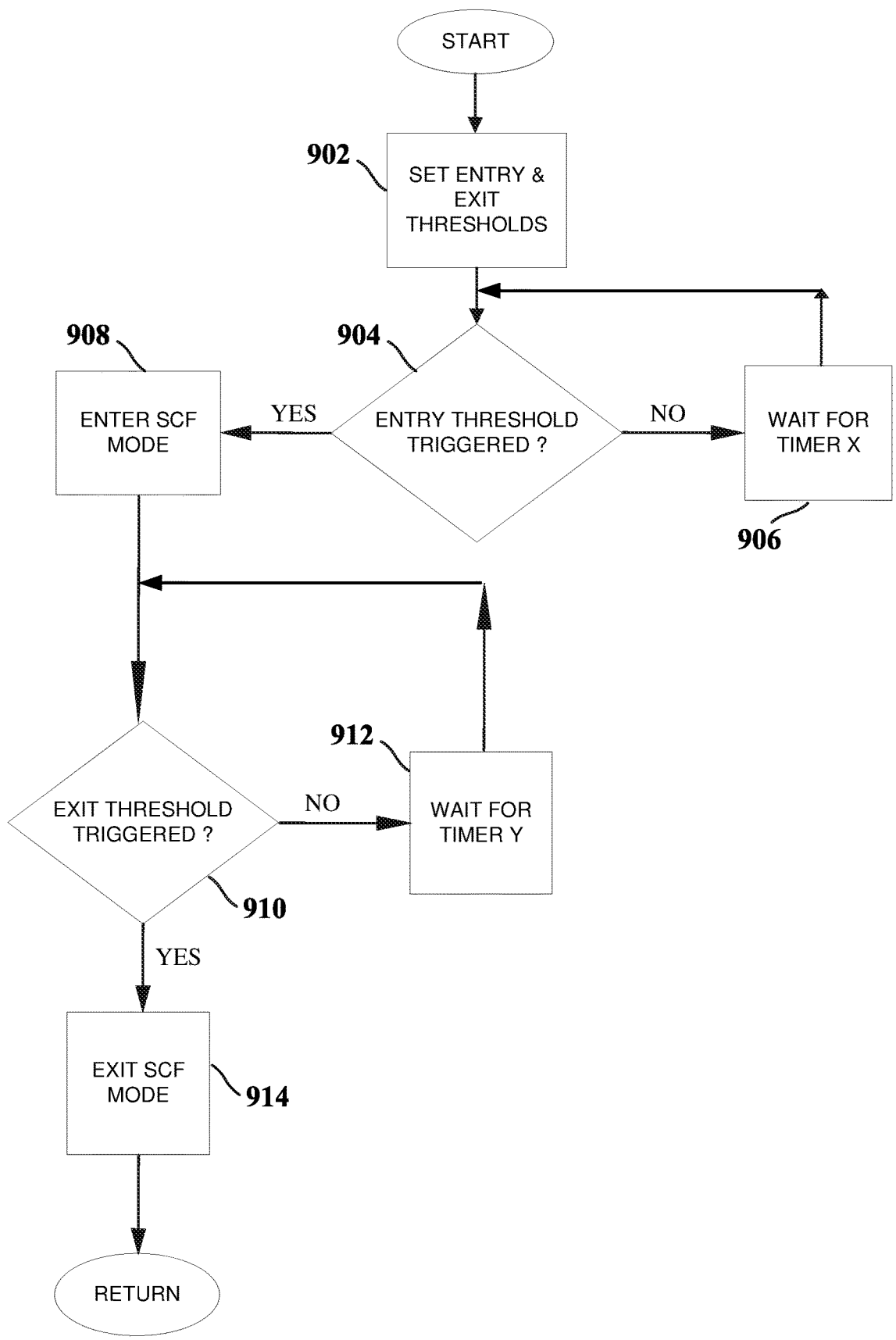
FIG. 9 illustrates a flow diagram of a method using a stepped clocking frequency mode in accordance with entry and exit thresholds, in accordance with certain aspects of the disclosure.

FIG. 9 is a process flow diagram of operating a clocked component using an SCF mode. After start, at block 902, the process sets the entry and exit threshold for one or more SCF modes, for example, temperature thresholds, power thresholds. The process also sets any parameters that may be used, such as one or more parameters of an SCF pattern. The configurations may come, for example, from an SCF configuration 528. After configuration at block 902, sensed values, for example from a sensor reader, are tested against the entry thresholds, for example a temperature threshold and a power threshold at block 904. If the entry thresholds are not exceeded, then at block 906, a wait timer is set. After expiration of the timer, the process continues back to test new, more recent, sensed values against the entry thresholds at block 904.

If, on the contrary, the entry thresholds are exceeded, then at block 908, an SCF mode is entered. The SCF mode remains until the SCF mode is exited at block 914. At block 910, current measured parameter values, for example, the current measured temperature and/or current measured power, are tested against exit thresholds. If the exit thresholds are not exceeded, then at block 912, a wait timer is set. At the expiration of the timer, new sensed values are tested against the exit thresholds again at block 910. If the exit thresholds are exceeded, then at block 914, the SCF mode is exited. While only one SCF mode and only one entry and exit threshold is shown, there may be multiple SCF modes with different entry and exit thresholds to suit different circumstances.

Figure 10:
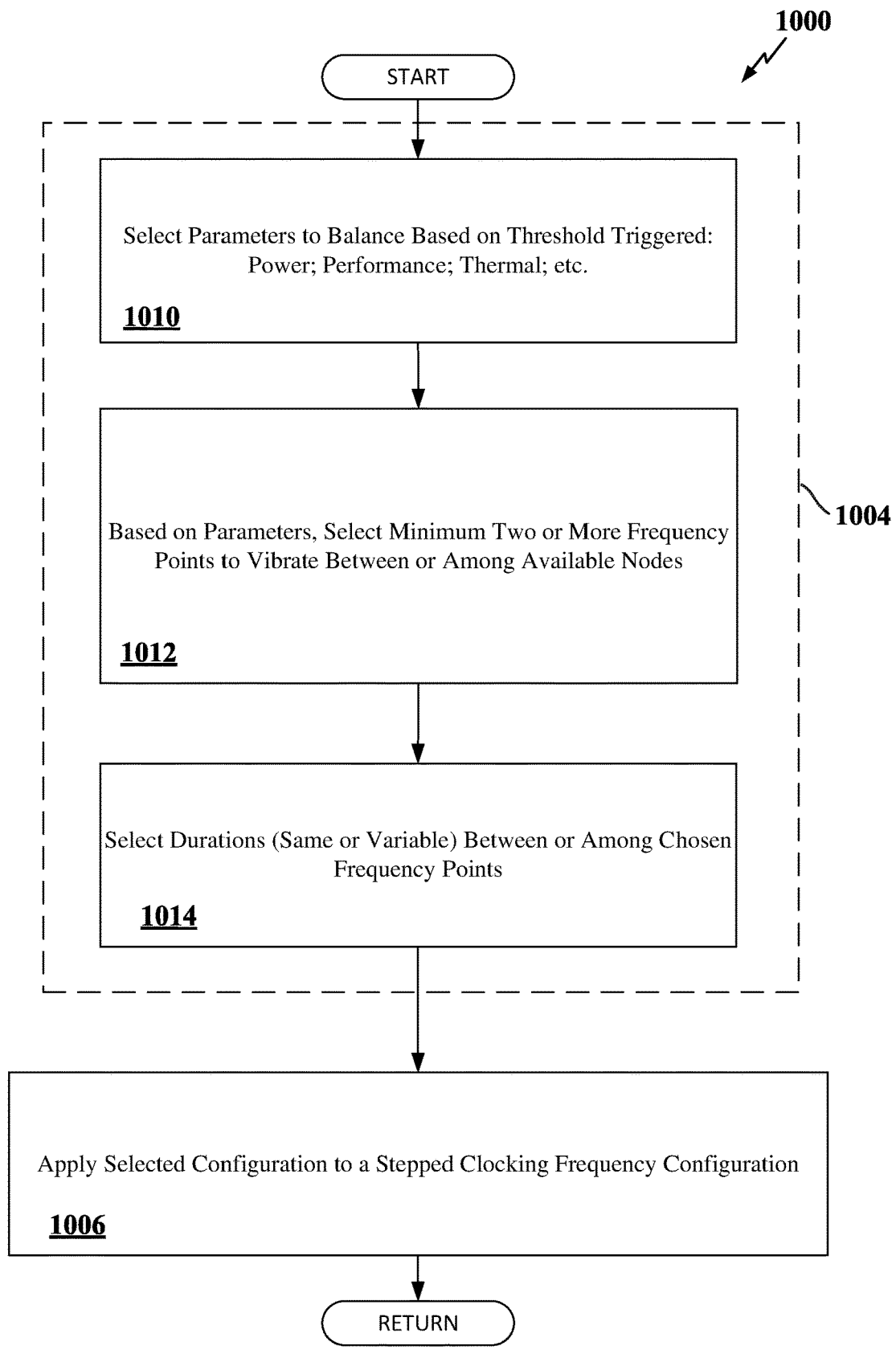
FIG. 10 illustrates a flow diagram of a method setting parameters for a stepped clocking frequency mode, in accordance with certain aspects of the disclosure.

FIG. 10 is a process flow diagram for configuring an SCF mode. The process has a selection section at block 1004 and an application section at block 1006. The selection section at block 1004 includes, at block 1010, selecting parameters to balance based on the threshold that is triggered. The thresholds may include, for example, power, performance, and thermal thresholds. A performance threshold may be related to anticipated demands from applications or bandwidth votes. A thermal threshold may be related to the current temperature of the clocked core as sensed directly or indirectly or as inferred by current into the clocked core. A thermal mitigation system may have a peak temperature of, for example 95° C. or 100° C. By selecting an SCF mode temperature threshold that is less than the thermal mitigation system temperature threshold, for example 85° C., the SCF mode may be entered before the clocked core reaches the thermal mitigation system temperature threshold and thermal mitigation may be avoided. In some examples, thermal mitigation overrides all other clocking. This may cause the clocking frequency to be reduced in SCF mode if the temperature passes the thermal mitigation threshold.

The selection section at block 1004 further includes, at block 1012, selecting a minimum of two or more frequency points to vibrate between or among. The frequency points correspond to those nodes that are nearest to a voted node. The voted nodes correspond to circumstances in the use of the clocked component that receive votes for operating system scheduler status, application performance logs including application startup and shutdown, anticipated application processing demand, and bandwidth, among others. The nodes are voted by various clients that use the clocked component. The two or more frequency points correspond to the clocking frequency values shown as being used in the patterns of FIGS. 5, 6, and 7 in which two, three or more frequency values were used. The clocking frequency vibrates between the selected frequency points in that the clocking frequency changes over time as shown in the patterns of FIGS. 5, 6, and 7. At block 1012, a higher two or more frequency points may be selected for votes from a high performance application startup. Lower frequency points may be selected for votes from a low battery mode. The selecting is based on balancing the selected parameters of block 1010. As an example, the first frequency point may be higher than the second frequency point by at least 10%. For a particular clocked component, a high frequency may be 2 GHz and the low frequency point may be 1 GHz. The periodicity between the two frequency points results in an average of less than 1.5 GHz. As another example, the first frequency point may be higher than the second frequency point by at least 3%. For a particular clocked component, a high frequency may be 3 GHz and the low frequency may be 2.91 GHz.

The selection section at block 1004 includes, at block 1014, selecting the duration between or among the chosen frequency points selected at block 1012. The durations may be the same for each frequency point or different for different frequencies or for different parts of a cycle. In FIGS. 6 and 7, the durations are all equal. FIG. 8 illustrates a selection of durations that are different at different frequency points and at different times in the cycle. Selection of the time durations is tunable based on the underlying system architecture, expectations from an end product, and design requirements. The durations may be selected to achieve a balance of all of the chosen parameters, for example power, performance, and thermal parameters. A good selection of the duration meets or exceeds the negative mis-correlation between expectations and requirements. As an example, the duration at both frequency points may be 0.5 ms or 1.0 ms. The duration may be much longer than the period of cycles of the clocking frequency. As an example, the duration may be more than a million cycles of the clocking frequency.

At block 1006, the selected configuration is applied to a stepped clocking frequency (SCF) configuration. The selected configuration is the combination of thresholds, frequency points, and durations from the selection phase. In the example of FIG. 4, the selected configuration is the SCF modes used by the SCF circuit 438 in the clock controller 420. The thresholds are installed at the comparators 414, 416, and 434. The SCF pattern is installed at the SCF circuit 438. In the example of FIG. 5, the selected configuration is stored in the SCF configuration 528 and the SCF manager 516 operates through the DCVS module 508 to govern frequencies through the clock controller 514. The configuration may be applied to a DCVS module or to a separate system. DCVS provides a structure by which a power manager may drive the processor core to thermal mitigation whether or not the processor core is operating in the SCF mode.

In some applications, for example a Linux kernel, a clocking frequency control circuit or technique is referred to as a governor or a CPU frequency governor. The examples herein, for example DCVS, DVFS, thermal mitigation and the SCF modes as well as other frequency scaling schemes may be referred to as schemes of a governor. The governor governs the behavior of the clocking frequency for different processors, interconnects, memory controllers, etc. Accordingly, the final operation of block 1106 may be referred to as applying a selected scheme to the associated frequency governor through DCVS or DVFS. Other terminology is used for other applications. Regardless of the terminology, the stepped clocking frequency mode provides significant benefits in performance and reliability in part, by balancing speed and thermal budget better than fixed clocking frequency schemes.

Figure 11:
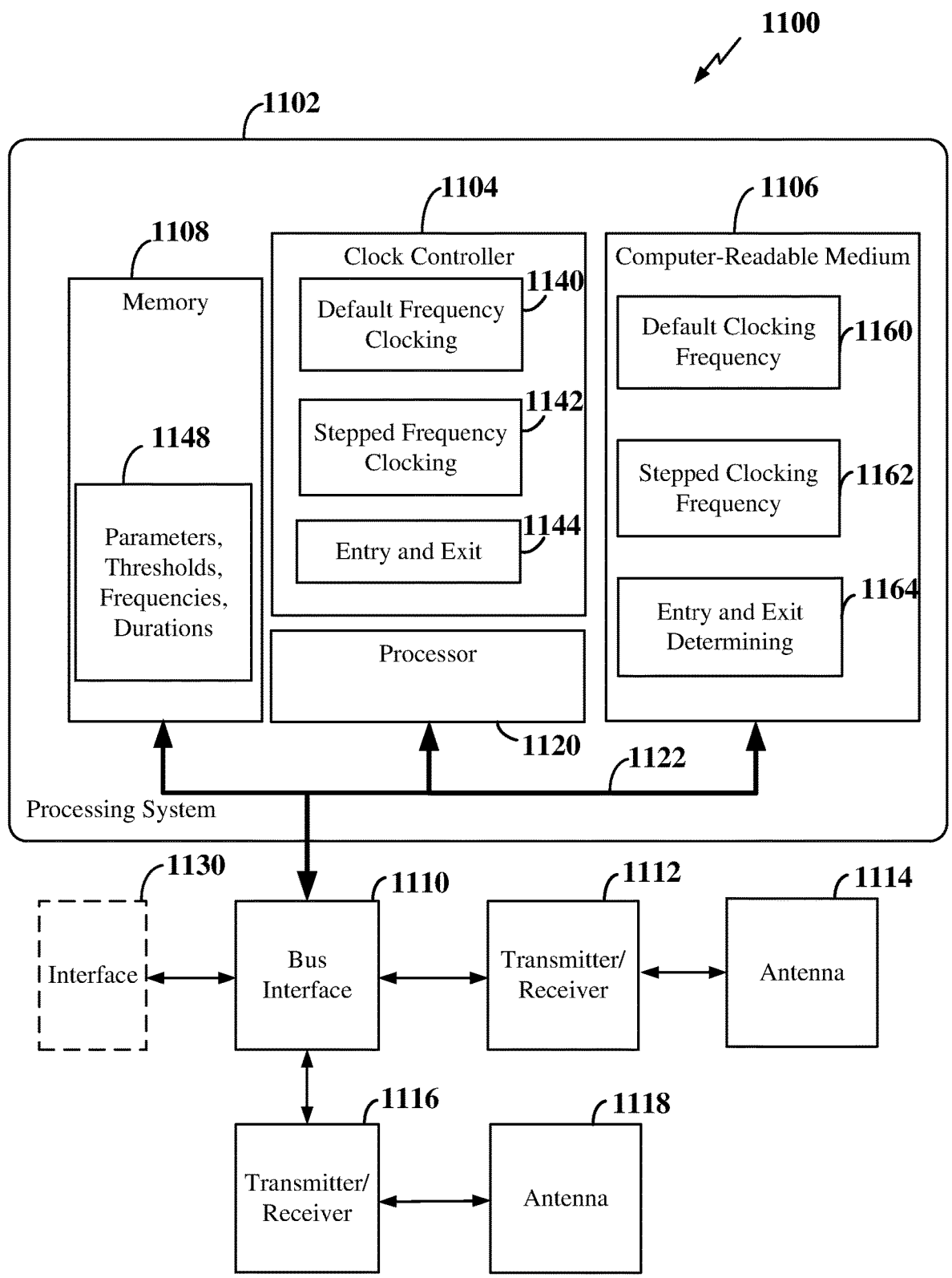
FIG. 11 illustrates a block diagram of an example hardware implementation for a device having a clocked processor core, a clock controller, and a memory, among other components, in accordance with certain aspects of the disclosure.

FIG. 11 illustrates a block diagram of an example of a hardware implementation for a device 1100, such as a user equipment, a portable device, a notebook computer, a tablet, a computer, a server, a router, a memory array or any other suitable device with one or more integrated circuits with clocked components. In this example, the clocked component is a processor 1120 with one or more processor cores as described above. In accordance with various aspects of the disclosure, an element, or any portion of an element, or any combination of elements may be implemented with the processing system 1102. The processing system 1102 may include one or more processors 1120. Examples of processors 1120 include microprocessors, microcontrollers, digital signal processors (DSPs), field programmable gate arrays (FPGAs), programmable logic devices (PLDs), state machines, gated logic, discrete hardware circuits, and other suitable hardware configured to be controlled by a clocking frequency and a voltage as described throughout this disclosure. In various examples, the device 1100 may be configured to perform any one or more of the functions described herein.

In this example, the processing system 1102 may be implemented with a bus architecture, represented generally by the bus 1122. The bus 1122 may include any number of interconnecting buses and bridges depending on the specific application of the processing system 1102 and the overall design constraints. The bus 1122 communicatively couples together various circuits including one or more processors (represented generally by the processor 1120), a clock controller 1104, a memory 1108, and computer-readable media (represented generally by the computer-readable medium 1106) having instructions stored thereon. The bus 1122 may also link various other circuits such as timing sources, peripherals, voltage regulators, and power management circuits, which are well known in the art, and therefore, will not be described any further. A bus interface 1110 provides an interface between the bus 1122 and a primary radio shown as a first transmitter/receiver 1112 or transceiver and a first at least one antenna 1114 and between the bus 1122 and an interface 1130. The first transmitter/receiver 1112 provides a communication interface or means for communicating through the first at least one antenna 1114 with various other apparatus over a wireless transmission medium. The bus interface 1110 also provides an interface between the bus 1122 and a secondary radio shown as a second transmitter/receiver 1116 and a second at least one antenna 1118. In some examples, the wireless device may include two or more transceivers, each configured to communicate with a respective network type (for example, terrestrial or non-terrestrial) through the same or different antennas. The interface 1130 provides a communication interface or means of communicating with various other apparatuses and devices (for example, other devices housed within the same apparatus or other external apparatus) over an internal bus or external transmission medium, such as an Ethernet cable. Depending upon the nature of the apparatus, the interface 1130 may include a user interface (for example, keypad, display, speaker, microphone, joystick). Of course, such a user interface is optional, and may be omitted in some examples, such as an IoT device.

The processor 1120 is responsible for managing the bus 1122 and general processing, including the execution of software stored on the computer-readable medium 1106. The software, when executed by the processor 1120, causes the processing system 1102 to perform the various functions described below for any particular apparatus. The computer-readable medium 1106 and the memory 1108 may also be used for storing data that is manipulated by the processor 1120 when executing software.

The clock controller 1104 may be a part of one or more processor cores of the processor 1120 and perform operations by means of a processor core executing software stored in the computer-readable medium 1106, or the clock controller 1104 may be independent of the processor 1120 within the processing system 1102 to execute software stored on the computer-readable medium 1106 using its own processing resources. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1106. The clock controller 1104 performs operations performed by comparators 414, 416, 434 and the clock controller 420 of FIG. 4. The clock controller 1104 performs operations performed by the SCF manager 516, DCVS module 508, table of chosen frequency nodes 510, and the clock controller 514 of FIG. 5.

The computer-readable medium 1106 may be a non-transitory computer-readable medium. A non-transitory computer-readable medium includes, by way of example, a magnetic storage device (for example, hard disk, floppy disk, magnetic strip), an optical disk (for example, a compact disc (CD) or a digital versatile disc (DVD)), a smart card, a flash memory device (for example, a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1106 may reside in the processing system 1102, external to the processing system 1102, or distributed across multiple entities including the processing system 1102. The computer-readable medium 1106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The device 1100 may be configured to perform any one or more of the operations described herein. In some aspects of the disclosure, the clock controller 1104, as utilized in the device 1100, may include circuitry configured for various functions.

The clock controller 1104 is coupled to the memory 1108 through the bus 1122. The memory 1108 includes a parameters register 1148 that may include parameters, thresholds, frequencies, durations, etc. for various different clocking frequency modes that may be used for defining clocking frequency modes and for determining entry to and exit from different clocking frequency modes and which may also include tables, maps or other data structures that indicate the current and average temperature, power, or other operating parameters of the clocked components of the processing system 1102. The parameters register 1148 may perform operations similar to the SCF configuration 528 of FIG. 5.

The clock controller 1104 may include default frequency clocking circuitry 1140 to clock the processor 1120 at a default clocking frequency. The default frequency clocking circuitry 1140 may include one or more hardware components that provide the physical structure that performs various processes related to generating the default clocking frequency and driving the processor 1120 at the default clocking frequency. The default frequency clocking circuitry 1140 may include functionality for a means for clocking a processor core at a default frequency in response to the processor core operating in a default mode of operation. The default frequency clocking circuitry 1140 may further be configured to execute default clocking frequency software 1160 included on the computer-readable medium 1106 to implement the default clocking frequency described herein.

The clock controller 1104 may include stepped frequency clocking circuitry 1142 configured to generate an SCF pattern and to drive the processor 1120 in the SCF mode as discussed herein. The stepped frequency clocking circuitry may include functionality for a means responsive to a parameter associated with the processor core exceeding a first threshold, for entering an SCF mode, that comprises alternating between clocking the processor core at a first frequency for a first time interval, and clocking the processor core at a second frequency different than the first frequency for a second time interval.

The stepped frequency clocking circuitry 1142 may further be configured to execute SCF software 1152 included on the computer-readable medium 1106 to implement one or more functions described herein.

The processing system 1102 clock controller 1104 may include entry and exit circuitry 1144 configured to perform operations entering and exiting the different frequency clocking modes as discussed herein. The entry and exit circuitry 1144 may include functionality for reading parameters of the processor 1120 from a parameters register 1148 of the memory 1108 during operation of the processor 1120, comparing the parameters to thresholds stored in the parameters register 1148 of the memory 1108 and determining which clocking frequency mode to enter and to exit including the default frequency clocking circuitry 1140 and the stepped frequency clocking circuitry 1142.

The entry and exit circuitry may include functionality for a means for detecting that the parameter associated with the processor core is below a second threshold, and a means responsive to the parameter associated with the processor core being below the second threshold, for exiting the SCF mode. The entry and exit circuitry 1144 may further be configured to execute entry and exit determining software 1164 included on the computer-readable medium 1106 to implement one or more functions described herein. The entry and exit circuitry performs operations similar to the comparators 414, 416, 434 of FIG. 4 and to the DCVS module 508 of FIG. 5.

The circuit architecture described herein may be implemented on one or more ICs, analog ICs, RFICs, mixed-signal ICs, ASICs, printed circuit boards (PCBs), electronic devices, etc. The circuit architecture described herein may also be fabricated with various process technologies such as complementary metal oxide semiconductor (CMOS), NMOS, PMOS, bipolar junction transistor (BJT), bipolar-CMOS (BiCMOS), silicon germanium (SiGe), gallium arsenide (GaAs), heterojunction bipolar transistors (HBTs), high electron mobility transistors (HEMTs), silicon-on-insulator (SOI), etc.

An apparatus implementing the circuits described herein may be a stand-alone device or may be part of a larger device. A device may be (i) a stand-alone IC, (ii) a set of one or more ICs that may include memory ICs for storing data and/or instructions, (iii) a radio frequency integrated circuit (RFIC) such as an RF receiver (RFR) or an RF transmitter/receiver (RTR), (iv) ASICs such as a mobile station modem (MSM), (v) a module that may be embedded within other devices, (vi) a receiver, cellular phone, wireless device, handset, or mobile unit, (vii) etc.

Figure 12:
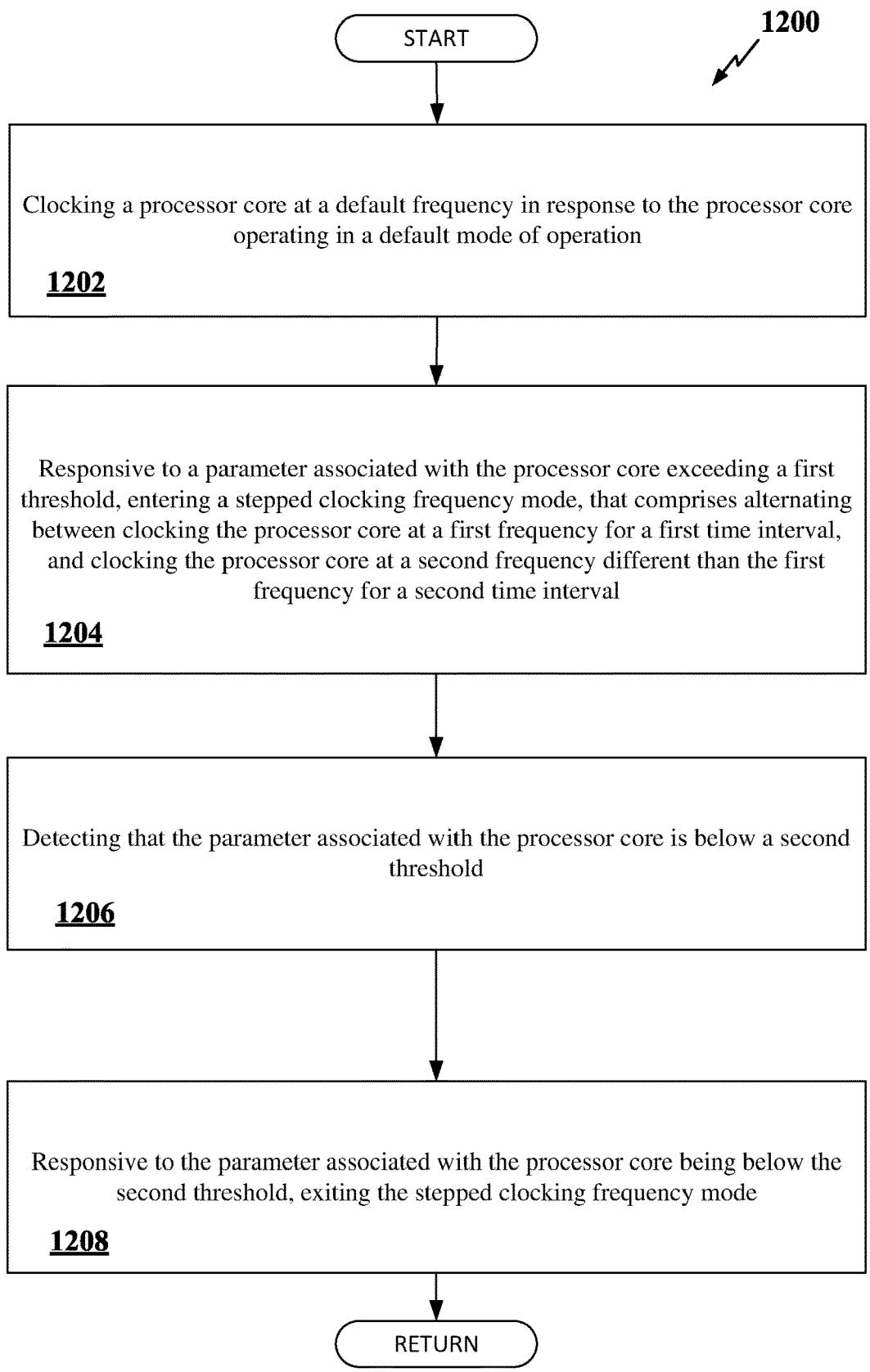
FIG. 12 illustrates a flow diagram of a method implementing a stepped clocking frequency mode, in accordance with certain aspects of the disclosure.

FIG. 12 is a process flow diagram illustrating an example of a method for using an SCF mode with a clocked component of a device, such as the device 102 of FIG. 1, the processor 402 of FIG. 4, the processor 502 of FIG. 5 or the device 1100 of FIG. 11. The method may also be performed by other circuitry or components or processing resources than those shown and described herein. The method is performed in the clock controller 1104 of FIG. 11 or other circuitry, and software as described in the context of FIG. 11. The method 1200 begins at block 1202 with clocking a processor core at a default frequency in response to the processor core operating in a default mode of operation.

In block 1204, responsive to a parameter associated with the processor core exceeding a first threshold, the clock controller may enter an SCF mode. In the SCF mode, the clock controller alternates between clocking the processor core at a first frequency for a first time interval and clocking the processor core at a second frequency different than the first frequency for a second time interval. In some examples, the parameter includes at least one of a temperature of the processor core, a rate of thermal increase of the processor core, and a power applied to the processor core. The core may refer to any clocked component as shown, for example, in FIGS. 1, 5, and 11.

In some aspects, the first frequency is higher than the second frequency by at least 3%. In some aspects, the first time interval and the second time interval are substantially the same. In some aspects, the first time interval and the second time interval are different. In some aspects, the first or the second time intervals are longer than a million cycles of the first frequency.

In block 1206, detecting that the parameter associated with the processor core is below a second threshold is performed. In block 1208, responsive to the parameter associated with the processor core being below the second threshold, exiting the SCF mode is performed.

The process of FIG. 12 may be performed for one or more clocked components simultaneously. For a multiple core processor, each of the processor cores may be clocked with different frequencies and frequency modes. There may be multiple SCF modes to suit different operational circumstances with different entry and exit thresholds.

As used herein, "or" is intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the examples of: a only, b only, c only, a combination of a and b, a combination of a and c, a combination of b and c, and a combination of a and b and c.

The various illustrative components, logic, logical blocks, modules, circuits, operations, and algorithm processes described in connection with the implementations disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The various illustrative logical blocks, modules, and circuits described in connection with the exemplary aspects disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

In one or more exemplary aspects, the functions described may be implemented in hardware, software, firmware, or any combination thereof. If implemented in software, the functions may be stored on or transmitter over as one or more instructions or code stored on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM EEPROM, CD-ROM or other optical disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The following provides an overview of examples of the present disclosure.

Example 1: An apparatus comprising: a processor core configured to perform operations at a received clocking frequency; and a clock controller configured to clock the processor core with a default frequency in response to the processor core operating in a default mode of operation, and, responsive to a parameter value associated with the processor core exceeding a first threshold, to enter a stepped clocking frequency mode, that comprises alternating between clocking the processor core at a first frequency for a first time interval, and clocking the processor core at a second frequency different than the first frequency for a second time interval.

Example 2: The apparatus of example 1, wherein the parameter associated with the processor core comprises a temperature or rate of temperature increase of the processor core.

Example 3: The apparatus of example 1, wherein the parameter associated with the processor core comprises a power applied to the processor core through a power manager.

Example 4: The apparatus of example 1, wherein the parameter associated with the processor core comprises a combination of a temperature or a rate of temperature increase of the processor core and a power applied to the processor core.

Example 5: The apparatus of any one or more of the above examples, further comprising a battery charge sensor register and wherein the clock controller is further to enter the stepped clocking frequency mode in response to a battery charge level value in the battery charge sensor register being less than a battery charge level threshold.

Example 6: The apparatus of any one or more of the above examples, wherein the clock controller is further configured to determine that the parameter value associated with the processor core is below a second threshold, and responsive to the parameter value being below the second threshold, to exit the stepped clocking frequency mode.

Example 7: The apparatus of any one or more of the above examples, wherein the stepped clocking frequency mode further comprises alternating to a third frequency for a third time interval between the first time interval and the second time interval.

Example 8: The apparatus of any one or more of the above examples, wherein the processor core is comprised by a multiple core processor having a second processor core, the apparatus further comprising: a second processor core; and a second clock controller configured to enter the stepped clocking frequency mode responsive a parameter value of the second processor core exceeding a second core threshold.

Example 9: The apparatus of any one or more of the above examples, further comprising: a parameter register to store values of the parameter; and a comparator coupled to the parameter register and to the clock controller to compare the values stored in the parameter register to the first threshold and signal the clock controller.

Example 10: The apparatus of example 9, further comprising a thermal sensor configured to measure a temperature value of the processor core and to send the temperature value to the parameter register.

Example 11: The apparatus of any one or more of the above examples, wherein the first frequency and the second frequency are selected based on at least one of power, performance, and temperature.

Example 12: The apparatus of any one or more of the above examples, wherein the first time interval and the second time interval are selected based on the first frequency and the second frequency.

Example 13: A method comprising: clocking a processor core at a default frequency in response to the processor core operating in a default mode of operation; and responsive to a parameter value associated with the processor core exceeding a first threshold, entering a stepped clocking frequency mode, that comprises alternating between clocking the processor core at a first frequency for a first time interval, and clocking the processor core at a second frequency different than the first frequency for a second time interval.

Example 14: The method of example 13, further comprising: detecting that the parameter value associated with the processor core is below a second threshold; and responsive to the parameter value associated with the processor core being below the second threshold, exiting the stepped clocking frequency mode.

Example 15: The method of example 13 or 13, wherein the first frequency is higher than the second frequency by at least 3%.

Example 16: The method of any one or more of examples 13 to 15, wherein the first time interval is longer than a million cycles of the first frequency.

Example 17: The method of any one or more of examples 13 to 16, wherein the first time interval and the second time interval are substantially the same.

Example 18: The method of any one or more of examples 13 to 17, further comprising: sending the parameter value to a parameter register; and comparing the parameter value stored in the parameter register to the first threshold.

Example 19: The method of example 18, wherein the parameter value comprises at least one of a temperature of the processor core, a rate of thermal increase of the processor core, and a power applied to the processor core.

Example 20: The method of any one or more of examples 13 to 19, wherein the stepped clocking frequency mode further comprises alternating to a third frequency for a third time interval between the first time interval and the second time interval.

Example 21: The method of any one or more of examples 13 to 20, wherein the processor core is comprised by a multiple core processor having a second processor core, the method further comprising:
measuring a temperature of the second processor core; and responsive to the second processor core temperature exceeding a second temperature threshold entering the stepped clocking frequency mode for the second processor core.

Example 22: The method of any one or more of examples 13 to 21, further comprising: selecting the first frequency and the second frequency based on one or more additional parameters.

Example 23: The method of example 22, wherein the one or more additional parameters comprise at least one of power, performance, or temperature.

Example 24: The method of any one or more of examples 13 to 23, further comprising: selecting the first time interval and the second time interval based on the first frequency and the second frequency.

Example 25: An apparatus comprising: means for clocking a processor core at a default frequency in response to the processor core operating in a default mode of operation; and means responsive to a parameter value associated with the processor core exceeding a first threshold, for entering a stepped clocking frequency mode, that comprises alternating between clocking the processor core at a first frequency for a first time interval, and clocking the processor core at a second frequency different than the first frequency for a second time interval.

Example 26: The apparatus of example 25, further comprising: means for detecting that the parameter value associated with the processor core is below a second threshold; and means responsive to the parameter value associated with the processor core being below the second threshold, for exiting the stepped clocking frequency mode.

Example 27: The apparatus of example 25 or 26, further comprising: means for setting a voltage supply to the processor core at a first voltage during the first time interval and a different second voltage during the second time interval.

What is claimed is:

1. An apparatus comprising:
    a processor core configured to perform operations at a received clocking frequency; and
    a clock controller configured to clock the processor core with a default frequency in response to the processor core operating in a default mode of operation, and, responsive to a parameter value associated with the processor core exceeding a first threshold, to enter a stepped clocking frequency mode, that comprises alternating between clocking the processor core at a first frequency for a first time interval, and clocking the processor core at a second frequency different than the first frequency for a second time interval by vibrating between at least the first frequency and the second frequency with a period.

2. The apparatus of claim 1, wherein the parameter value associated with the processor core comprises a temperature or rate of temperature increase of the processor core.

3. The apparatus of claim 1, wherein the parameter value associated with the processor core comprises a power applied to the processor core through a power manager.

4. The apparatus of claim 1, wherein the parameter value associated with the processor core comprises a combination of a temperature or a rate of temperature increase of the processor core and a power applied to the processor core.

5. The apparatus of claim 1, further comprising a battery charge sensor register and wherein the clock controller is further to enter the stepped clocking frequency mode in response to a battery charge level value in the battery charge sensor register being less than a battery charge level threshold.

6. The apparatus of claim 1, wherein the clock controller is further configured to determine that the parameter value associated with the processor core is below a second threshold, and responsive to the parameter value being below the second threshold, to exit the stepped clocking frequency mode.

7. The apparatus of claim 1, wherein the stepped clocking frequency mode further comprises alternating to a third frequency for a third time interval between the first time interval and the second time interval.

8. The apparatus of claim 1, wherein the processor core is comprised by a multiple core processor having a second processor core, the apparatus further comprising:
    a second processor core; and
    a second clock controller configured to enter the stepped clocking frequency mode responsive a parameter value of the second processor core exceeding a second core threshold.

9. The apparatus of claim 1, further comprising:
    a parameter register to store the parameter value; and
    a comparator coupled to the parameter register and to the clock controller to compare the parameter value stored in the parameter register to the first threshold and signal the clock controller.

10. The apparatus of claim 9, further comprising a thermal sensor configured to measure a temperature value of the processor core and to send the temperature value to the parameter register.

11. The apparatus of claim 1, wherein the first frequency and the second frequency are selected based on at least one of a power, a performance, and a temperature.

12. The apparatus of claim 1, wherein the first time interval and the second time interval are selected based on the first frequency and the second frequency.

13. A method comprising:
    clocking a processor core at a default frequency in response to the processor core operating in a default mode of operation; and
    responsive to a parameter value associated with the processor core exceeding a first threshold, entering a stepped clocking frequency mode, that comprises alternating between clocking the processor core at a first frequency for a first time interval, and clocking the processor core at a second frequency different than the first frequency for a second time interval by vibrating between at least the first frequency and the second frequency with a period.

14. The method of claim 13, further comprising:
    detecting that the parameter value associated with the processor core is below a second threshold; and
    responsive to the parameter value associated with the processor core being below the second threshold, exiting the stepped clocking frequency mode.

15. The method of claim 13, wherein the first frequency is higher than the second frequency by at least 3%.

16. The method of claim 13, wherein the first time interval is longer than a million cycles of the first frequency.

17. The method of claim 13, wherein the first time interval and the second time interval are substantially the same.

18. The method of claim 13, further comprising:
    sending the parameter value to a parameter register; and
    comparing the parameter value stored in the parameter register to the first threshold.

19. The method of claim 18, wherein the parameter value comprises at least one of a temperature of the processor core, a rate of thermal increase of the processor core, and a power applied to the processor core.

20. The method of claim 13, wherein the stepped clocking frequency mode further comprises alternating to a third frequency for a third time interval between the first time interval and the second time interval.

21. The method of claim 13, wherein the processor core is comprised by a multiple core processor having a second processor core, the method further comprising:
   measuring a temperature of the second processor core; and
   responsive to the temperature of the second processor core exceeding a second temperature threshold entering the stepped clocking frequency mode for the second processor core.

22. The method of claim 13, further comprising:
   selecting the first frequency and the second frequency based on one or more additional parameters.

23. The method of claim 22, wherein the one or more additional parameters comprise at least one of power, performance, or temperature.

24. The method of claim 13, further comprising:
   selecting the first time interval and the second time interval based on the first frequency and the second frequency.

25. An apparatus comprising:
   means for clocking a processor core at a default frequency in response to the processor core operating in a default mode of operation; and
   means responsive to a parameter value associated with the processor core exceeding a first threshold, for entering a stepped clocking frequency mode, that comprises alternating between clocking the processor core at a first frequency for a first time interval, and clocking the processor core at a second frequency different than the first frequency for a second time interval by vibrating between at least the first frequency and the second frequency with a period.

26. The apparatus of claim 25, further comprising:
   means for detecting that the parameter value associated with the processor core is below a second threshold; and
   means responsive to the parameter value associated with the processor core being below the second threshold, for exiting the stepped clocking frequency mode.

27. The apparatus of claim 25, further comprising:
   means for setting a voltage supply to the processor core at a first voltage during the first time interval and a different second voltage during the second time interval.

28. The apparatus of claim 25, wherein the first frequency is higher than the second frequency by at least 3%.

29. The apparatus of claim 25, wherein the first time interval is longer than a million cycles of the first frequency.

* * * * *